United States Patent
Stendebach

(10) Patent No.: US 11,443,470 B2
(45) Date of Patent: Sep. 13, 2022

(54) SYSTEMS AND METHODS FOR SIMULATING ANIMATION OF AN OBJECT

(71) Applicant: STACK'S-BOWERS NUMISMATICS, LLC, Costa Mesa, CA (US)

(72) Inventor: Larry J. Stendebach, Irvine, CA (US)

(73) Assignee: Stack's-Bowers Numismatics, LLC, Costa Mesa, CA (US)

( * ) Notice: Subject to any disclaimer, the term of this patent is extended or adjusted under 35 U.S.C. 154(b) by 0 days.

(21) Appl. No.: 17/393,951

(22) Filed: Aug. 4, 2021

(65) Prior Publication Data

US 2022/0130092 A1 Apr. 28, 2022

Related U.S. Application Data

(63) Continuation of application No. 17/391,553, filed on Aug. 2, 2021.
(Continued)

(51) Int. Cl.
*G06T 13/20* (2011.01)
*G06T 7/00* (2017.01)
(Continued)

(52) U.S. Cl.
CPC .............. *G06T 13/20* (2013.01); *G06T 7/97* (2017.01); *G06T 15/04* (2013.01); *G06T 15/60* (2013.01);
(Continued)

(58) Field of Classification Search
CPC ......... G06T 13/20; G06T 15/04; G06T 15/60; G06T 17/00; G06T 2200/08;
(Continued)

(56) References Cited

U.S. PATENT DOCUMENTS 5,144,495 A * 9/1992 Merton .................... G07D 5/00
359/385
5,646,388 A * 7/1997 D'Entremont ....... B42D 25/328
235/380
(Continued)

OTHER PUBLICATIONS

Unknown: "Quick Model & UV Unwrap—Coin", Oct. 1, 2019 (Oct. 1, 2019), pp. 1-2, XP055901666, Retrieved from the Internet: URL:https://www.youtube.com/watch?v=H1IVNdHqDtA.
(Continued)

*Primary Examiner* — Sing-Wai Wu
(74) *Attorney, Agent, or Firm* — Husch Blackwell LLP

(57) ABSTRACT

Systems and methods for simulating animation of an object are provided. Such systems and methods include capturing a first sequence of images of the object with a camera while in an activated lighting apparatus, importing the first sequence of images into a first stage video file having a preconfigured size and masked off such that the first surface appears over a first background, and incorporating the first stage video file into a template of a three-dimensional (3D) model by aligning the first surface with a video mask of the template such that the video mask obscures the first background of the first stage video file and superimposes a location of the first surface in the first stage video file onto a virtual surface of the 3D model.

16 Claims, 20 Drawing Sheets

Related U.S. Application Data

(60) Provisional application No. 63/152,134, filed on Feb. 22, 2021, provisional application No. 63/105,074, filed on Oct. 23, 2020.

(51) Int. Cl.
  *G06T 15/04* (2011.01)
  *G06T 15/60* (2006.01)
  *G06T 17/00* (2006.01)
  *H04N 5/225* (2006.01)
  *H04N 5/235* (2006.01)

(52) U.S. Cl.
  CPC .......... *G06T 17/00* (2013.01); *H04N 5/2256* (2013.01); *H04N 5/2354* (2013.01); *G06T 2200/08* (2013.01); *G06T 2207/10016* (2013.01)

(58) Field of Classification Search
  CPC ............ G06T 2207/10016; G06T 7/97; H04N 5/2256; H04N 5/2354; H04N 5/2254; G06Q 30/0623; G11B 27/031; H05B 45/30
  See application file for complete search history.

(56) References Cited

U.S. PATENT DOCUMENTS

| | | | | |
|---|---|---|---|---|
| 7,874,701 | B2* | 1/2011 | Pohlert | G03B 15/03 362/244 |
| 2004/0004627 | A1* | 1/2004 | Ohki | H04N 19/94 345/698 |
| 2011/0031889 | A1* | 2/2011 | Shim | H05B 47/29 315/158 |
| 2012/0062719 | A1* | 3/2012 | Debevec | H04N 5/2251 348/77 |
| 2012/0127320 | A1* | 5/2012 | Balogh | H04N 13/363 353/121 |
| 2014/0109162 | A1* | 4/2014 | Licht | H04N 21/2743 725/113 |
| 2017/0256091 | A1 | 9/2017 | Price | |
| 2020/0124247 | A1* | 4/2020 | Van Gheluwe | G02B 27/0955 |
| 2021/0042950 | A1* | 2/2021 | Wantland | G06T 19/006 |

OTHER PUBLICATIONS

El-Hakim Sabry F et al.: "Visualisation of Highly Textured Surfaces", Archaeology and Intelligent Cultural Heritage, Jan. 1, 2003 (Jan. 1, 2003), XP055901592, Retrieved from the Internet: URL:https://www.ikg.uni-hannover.de/fileadmin/ikg/Forschung/publications/ElHakimGonzoPicardGirardiSimoniPaquetViktorBrenner_Vast2003.pdf.

Palma G et al.: "Telling the Story of Ancient Coins by Means of Interactive RTI Images Visualisation", Archaeology in the Digital Era Papers From the 40th Annual Conference of Computer Applications and Quantitative Methods in Archaeology (CAA), Southampton, Jan. 1, 2012 (Jan. 1, 2012), pp. 177-185, XP055900452, DOI: https://doi.org/10.1017/9789048519590.019 Retrived from the nternet: URL:http://vcg_isti.cnr.it/Publications/2012/PSPBBBS12/caa_2012.pdf.

Zambanini Sebastian et al.: "3D acquisition of historical coins and its application area in numismatics", Proceedings of SPIE, vol. 7531, Jan. 1, 2010 (Jan. 1, 2010), XP055900458, 1000 20th St. Bellingham WA 98225-6705 USA, ISSN: 0277-786X, DOI: 10.117/12.840203, ISBN: 978-1-5106-4548-6.

Mudge Mark et al.: "Reflection Transformation Imaging and Virtual Representations of Coins from the Hospice of he Grand St. Bernard", Jan. 1, 2005 (Jan. 1, 2005), XP055900455, DOI: 10.2312/vast/vast05/029-039, Retrieved from the Internet: URL:http://diglib.eg.org/bitstream/handle/10.2312/VAST.VAST05.029-039/029-039.pdf?sequence=1&isAllowed=y.

* cited by examiner

SYSTEMS AND METHODS FOR SIMULATING ANIMATION OF AN OBJECT

CROSS REFERENCE TO RELATED APPLICATIONS

This application is a continuation of U.S. patent application Ser. No. 17/391,553, filed on Aug. 2, 2021, which claims priority to U.S. application Ser. No. 63/105,074 filed Oct. 23, 2020 and titled "METHOD OF ANIMATING COINS AND COLLECTIBLES," and to U.S. application Ser. No. 63/152,134 filed Feb. 22, 2021 and titled "METHOD OF ANIMATING CARDS AND COLLECTIBLES." U.S. application Ser. Nos. 17/391,553, 63/105,074 and 63/152,134 are hereby fully incorporated by reference as if set forth fully herein.

FIELD

The present invention generally relates to systems and methods for creating an animated visual approximation of a surface of an object. More particularly, such systems and methods relate to creating an animated visual approximation of a surface of a generally flat surface including a disk such as a coin or a coin-like object and a generally planar object such as a collectible card.

BACKGROUND

In recent years, technology and world events have drastically altered the collectible and auction industries such that very few traditional collectible shows or in-person auctions happen and most sales now occur through online marketplaces. With such a major shift in buying practices, collectibles sellers have a need for an improved method of representing products online and visually approximating the appearance of these products, particularly how the products would look in a potential buyer's hand.

Although photographs provide static views, photos do not accurately show how light interacts with the surfaces of a collectible object. In particular, photographs have difficulty rendering complex surface details such as foiling, holograms, and other effects that change as an observer moves or as lighting changes on a collectible. Further, photographs can often hide scratches and marks collectors need to see to accurately judge the quality and condition of a collectible. For example, photographs do not accurately capture the luster of a coin (i.e., how changes in light reflect or play across the surfaces of a coin) and are prone to concealing details that might otherwise be visible if viewed in hand. Such details might include scratches or other signs of broken luster that could indicate cleaning or alterations. In addition, manufacturers of newer collectable objects frequently develop new and innovative products having novel features and effects to entice collecting consumers, but as physical card shops and shows become less common, consumers have limited opportunities to physically interact with the products in hand.

In the current collectable market high bid increments are sometimes used when auctioning collectibles. This fact means that a single additional bid can result in a sales price that is thousands or tens of thousands of dollars higher. With many bidders participating online and few being able to view the underlying object in hand, auction houses rely on online presentations to provide buyers the confidence in an object's quality needed to bid. Astute buyers are aware of the limitations of photographs and generally are unimpressed by quick cellphone videography or other such methods commonly deployed by the auction houses.

In light of the foregoing issues, there is a continuing need for improved systems and methods for fully capturing and representing collectible objects for viewing remotely via an online or similar platform.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
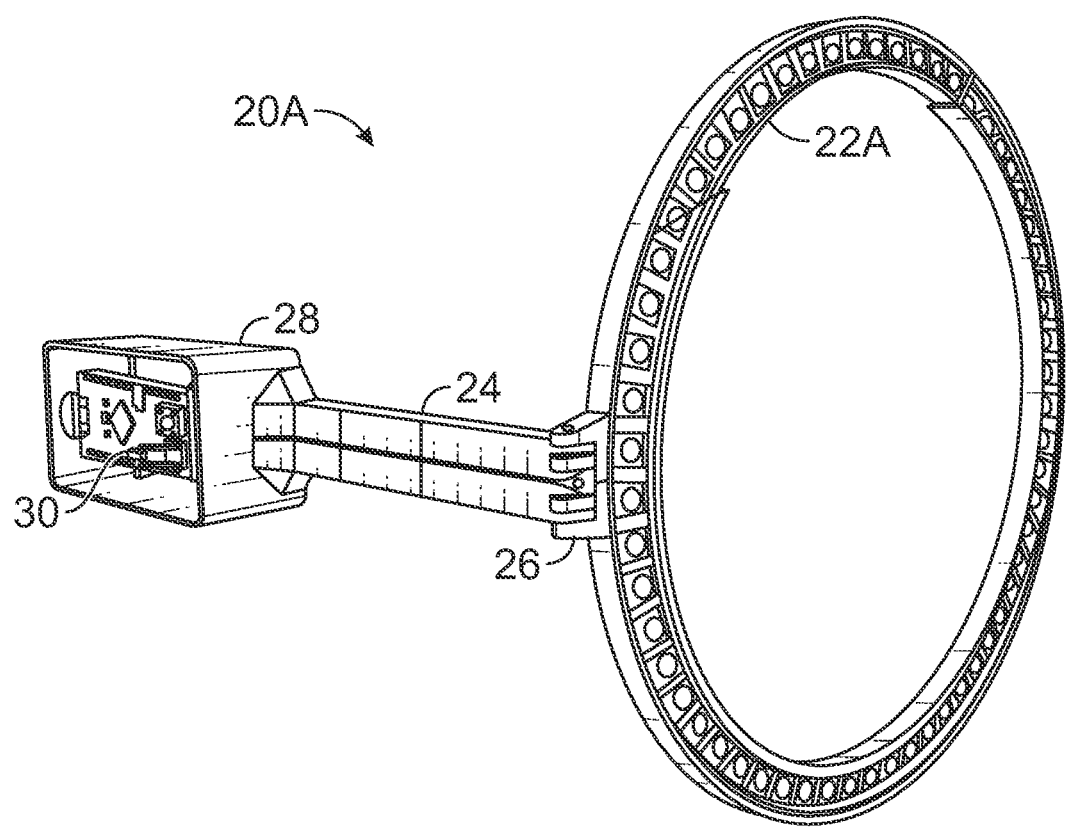
FIG. 1 is a perspective of a light ring assembly according to disclosed embodiments.
Figure 2:
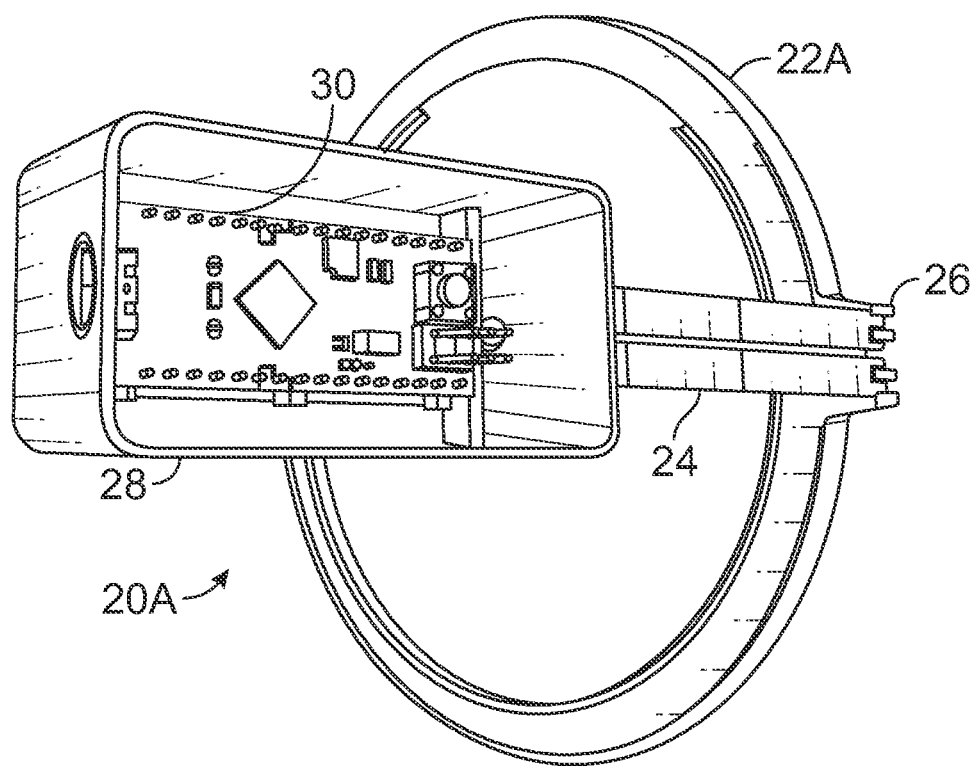
FIG. 2 is a perspective of a light ring assembly according to disclosed embodiments.

Embodiments described herein relate to systems and methods for virtually animating an object such as a collectible item. In particular, the present disclosure provides solutions to the industry-wide problems of remote viewing of such object by rendering an accurate animation of how such objects look in hand via an interactive online experience of such animations where only offline experiences were once available. In some embodiments, the systems and methods described herein can produce ultra-high-resolution animations depicting how luster moves over an object's surfaces while rotating, allowing possible imperfections to be revealed or that show off the best aspects of the surfaces (e.g., foil, refractor, hologram, rainbow, etc.). Additionally, the systems and methods described herein can provide the rendered animations in industry standard, web-friendly, video file formats customers can use without additional cost or inconvenience. For example, in some embodiments, the video animations can be displayed using streaming platforms to cater to online video streamers. In general, the systems and methods described herein provide animated images that can increase online buyer confidence and increase bids for objects in the marketplace. Such systems and methods can also provide object manufacturers high quality online presentations enabling them to better market their products and enables collectors to demonstrate the in-hand appearance of a collectible online.

Some embodiments disclosed herein can be directed to a lighting apparatus for use in simulating animation of an object. In particular, the lighting apparatus can include mounting connectors configured to couple a camera to the lighting apparatus at a plurality of positions, a ring or frame positioned above and defining an illumination region and comprising a plurality of light emitting diodes (LEDs), and a microcontroller configured to control the plurality of LEDs to rotate light around a first surface of the object placed within the illumination region. In some embodiments, the plurality of LEDs can include pure white LEDs which produce more accurate and appealing final animation than color RGB LEDs that simulated white by combining multiple color outputs together.

In some embodiments, the microcontroller can control the plurality of LEDs by dimming and brightening each of the plurality of LEDs in a sequenced order around the ring or frame such that a first of the plurality of LEDs is being dimmed from fully on to fully off while a second of the plurality of LEDs is being brightened from fully off to fully on. Furthermore, the microcontroller can control the first of the plurality of LEDs and the second of the plurality of LEDs such that the first of the plurality LEDs reaches fully off simultaneous with the second of the plurality LEDs reaching fully on, and once the first of the plurality LEDs reaches fully off and the second of the plurality LEDs reaches fully on, the microcontroller can begin to dim the second of the plurality LEDs to fully off and begins to control a next one of the plurality of LEDs in the sequenced order to brighten the next one of the plurality of LEDs from fully off to fully on.

FIGS. 1-4 show an example embodiment of the lighting apparatus as a lighting ring assembly 20A. The lighting ring assembly 20A can include a RGBW LED ring 22A that is pivotably connected to a leg 24 by a hinge 26. In some embodiments the RGBW LED ring 22A can have a 6 inch diameter. In some embodiments, the RGBW LED ring 22A can include Adafruit® NeoPixel® 60 ring—5050 RGBW LED having integrated drivers and natural white, 4500K LEDs. Adafruit and NeoPixel are federally registered trademarks of Adafruit Industries of New York, N.Y. It is envisioned that other LED rings could be used that include similar or better LED density. In some embodiments, the lighting ring assembly 20A can include an enclosure 28 provided at an end of the leg 24 opposite the ring 22A that houses a microcontroller 30. In some embodiments, the microcontroller 30 can include an Arduino® 5V microcontroller. Arduino is a federally registered trademark of Arduino AG of Switzerland. It is envisioned that other microcontrollers such as USB-based Atmel® 32u4 5 volt or similar microcontrollers can also be used. Atmel is a federally registered trademark of Atmel Corporation of San Jose, Calif. In some embodiments, the microcontroller 30 can be programmed to smoothly energize or brighten and then fade each of the LEDs around RGBW LED ring 22A in a sequence. In some embodiments, the leg 24 and the enclosure 28 can be made from Polylactic acid (PLA) filament using 3D printing.

Figure 3:
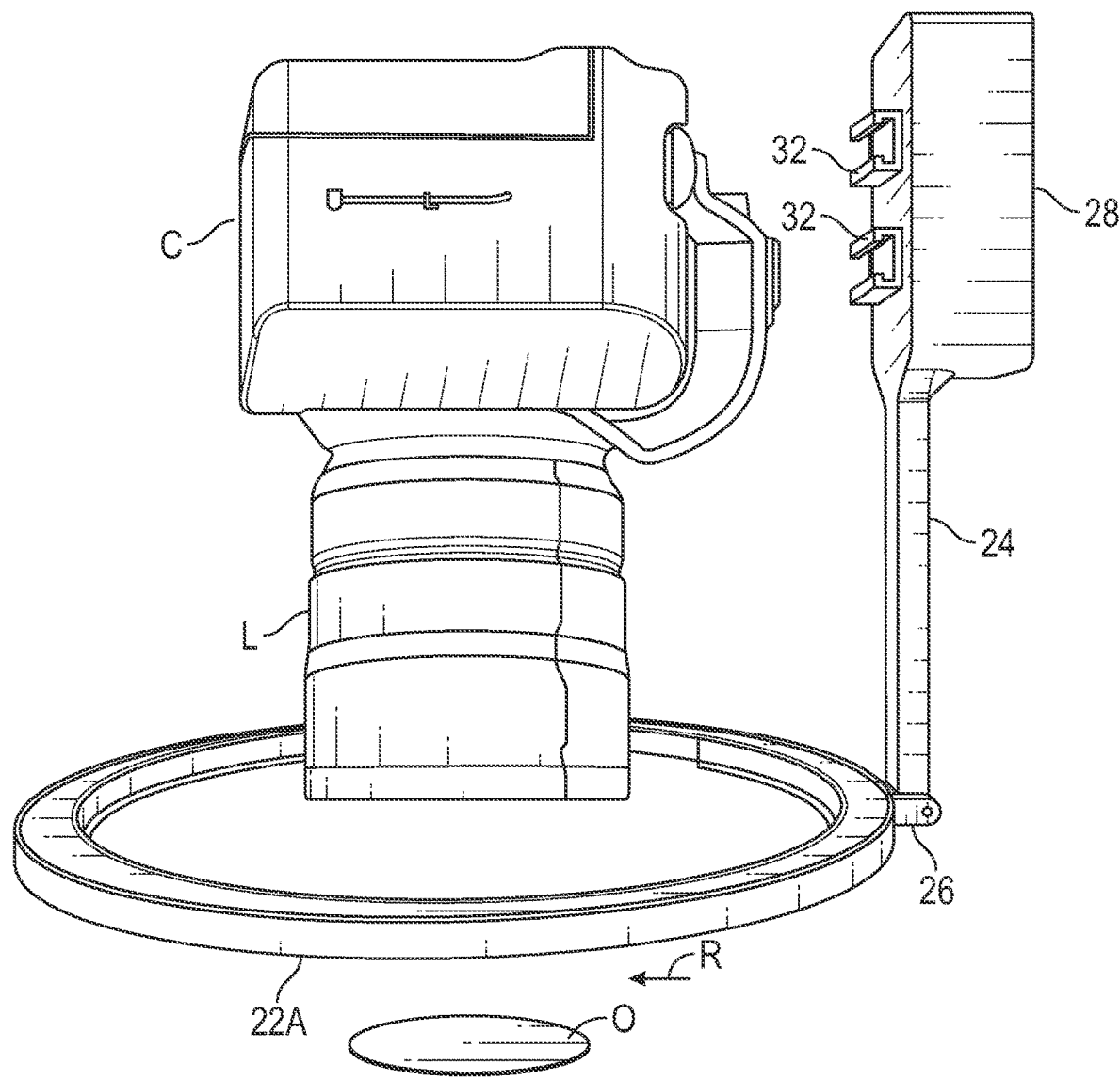
FIG. 3 is a perspective of a light ring assembly in combination with a camera according to disclosed embodiments.

FIG. 3 shows the lighting ring assembly 20A in conjunction with a camera C, and a lens L in a configuration for capturing a plurality of images used in animating an approximation of an object O (e.g., a coin). As shown, the leg 24 can include multiple connectors 32 for connecting the light ring assembly 20A to the camera C, such that a position of the light ring assembly 20A relative to the camera C may be selectively adjusted to provide a preferred lighting setup for the object O. As seen in FIG. 3, in some embodiments, the object O can be positioned within an illumination region R of the light ring assembly 20A such that a first surface of the object O is approximately parallel to a focus plane of the camera C and the lens L. In some embodiments, light ring assembly 20A can define the illumination region R from a position above the object O. In particular, the illumination region R can include an area where light illuminated from the LEDs of the RGBW LED ring 22A will be directed onto the surface of the object O.

Figure 4:
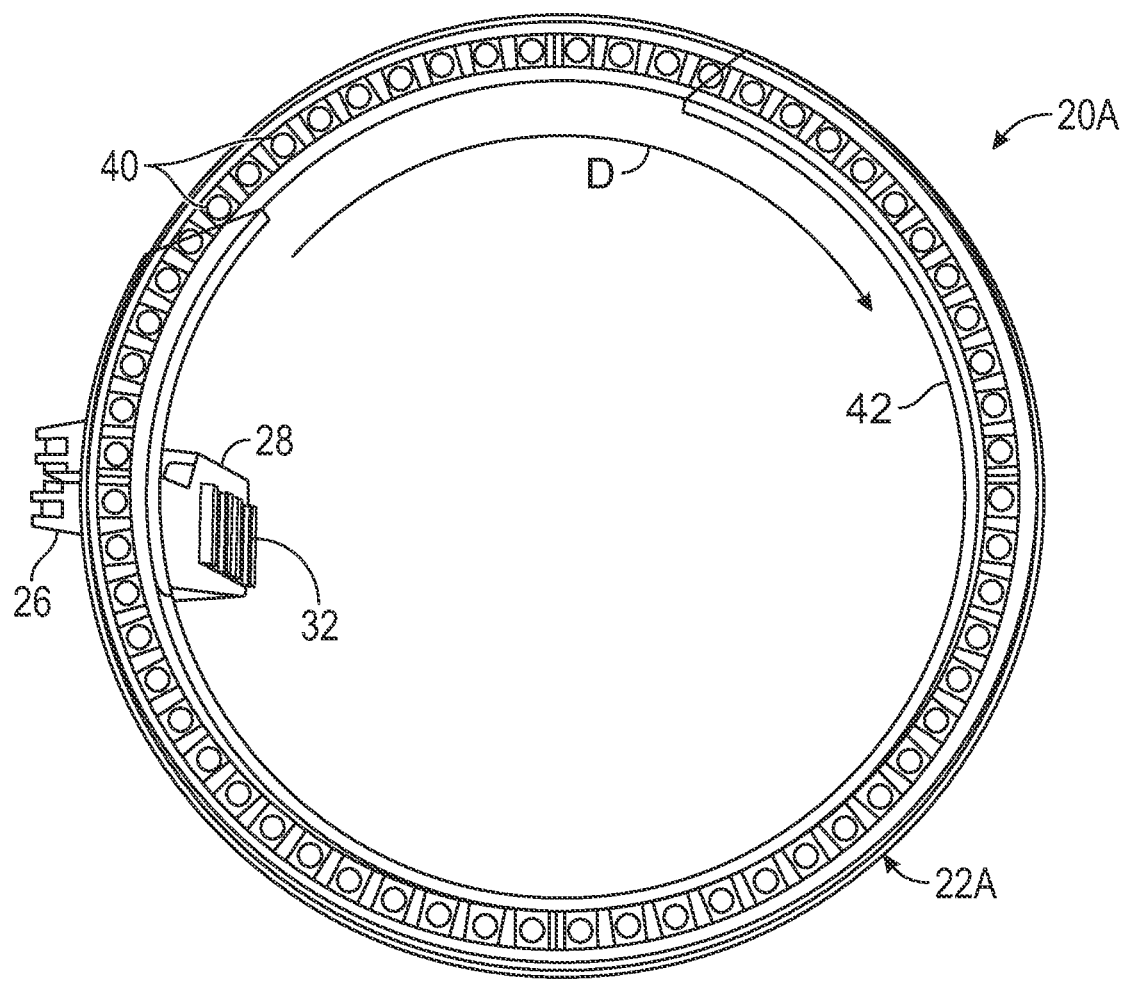
FIG. 4 is a perspective of a light ring assembly illustrating a direction of lighting according to disclosed embodiments.

In some embodiments, as seen in FIG. 4, the RGBW LED ring 22A can include a plurality of LEDs 40 arranged in a circle and a transparent diffuser 42 (shown partially fragmented to illustrate the LEDs). The diffuser 42 can be a 3D printed transparent PLA filament. In some embodiments, the RGBW LED ring 22A can have sixty evenly spaced LEDs mounted thereon. However other numbers of LEDs are also contemplated.

Figure 5:
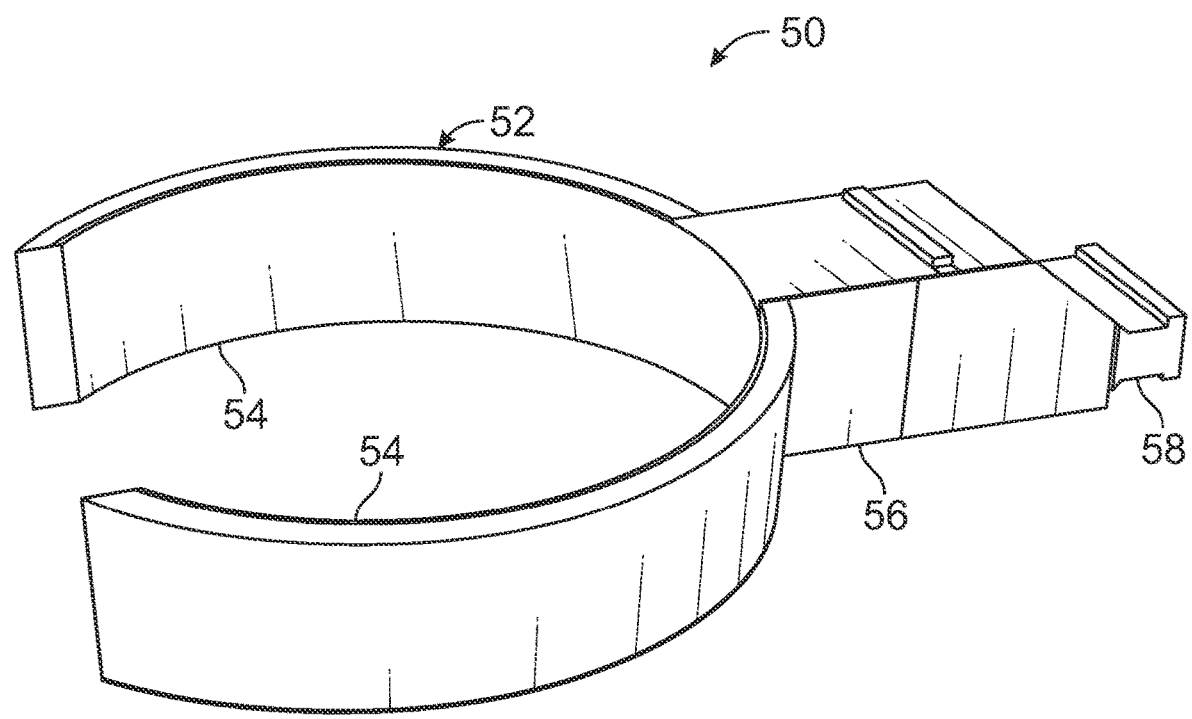
FIG. 5 is a perspective of a lens attachment according to disclosed embodiments.
Figure 6:
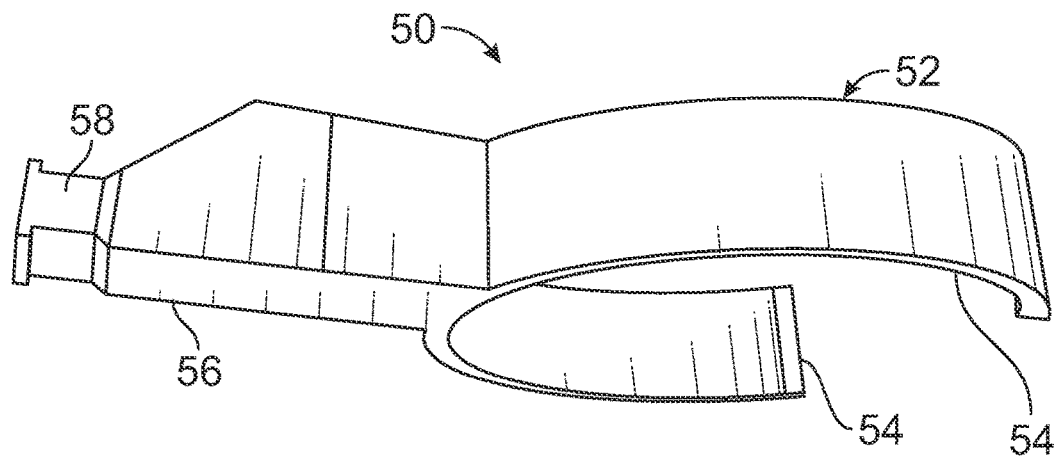
FIG. 6 is a perspective of a lens attachment according to disclosed embodiments.

FIGS. 5 and 6 illustrate a clamp 50 sized and shaped for selectively attaching lighting ring assembly 20A to the lens L of the camera C. In some embodiments, the clamp 50 can be 3D printed from PLA filament. As seen in FIGS. 5 and 6, the clamp 50 can include a flexibly resilient clip 52 comprising opposing semi-circular arms 54 extending from a stem 56 and having a base 58 opposite the clip 52. The configuration and materials can provide the clip 52 sufficient flexibility so the clamp 52 can be flexed open for mounting around the lens L and sufficiently resilient to close around the lens L so as to provide a friction fit around the lens L once in a desired position. As will be appreciated by those skilled in the art, the lighting ring assembly 20A and the clamp 50 can be used in combination with the camera C to provide a desired lighting setup for the object O.

The lighting and camera setup described above can eliminate deficiencies inherent in traditional photographic methods used for objects such as coins that hide imperfections and do not capture luster. Further, the setup can enable capture of a plurality of images (e.g. a video) of uniform quality. The setup can also enable a user to perform a procedure for animating coins using a combination of ultra-high resolution videography, custom built and programmed light rigs, and, as discussed more below, a 3D rendering template providing an improved approximation of how the object O looks when in a viewer's hand.

Figure 7:
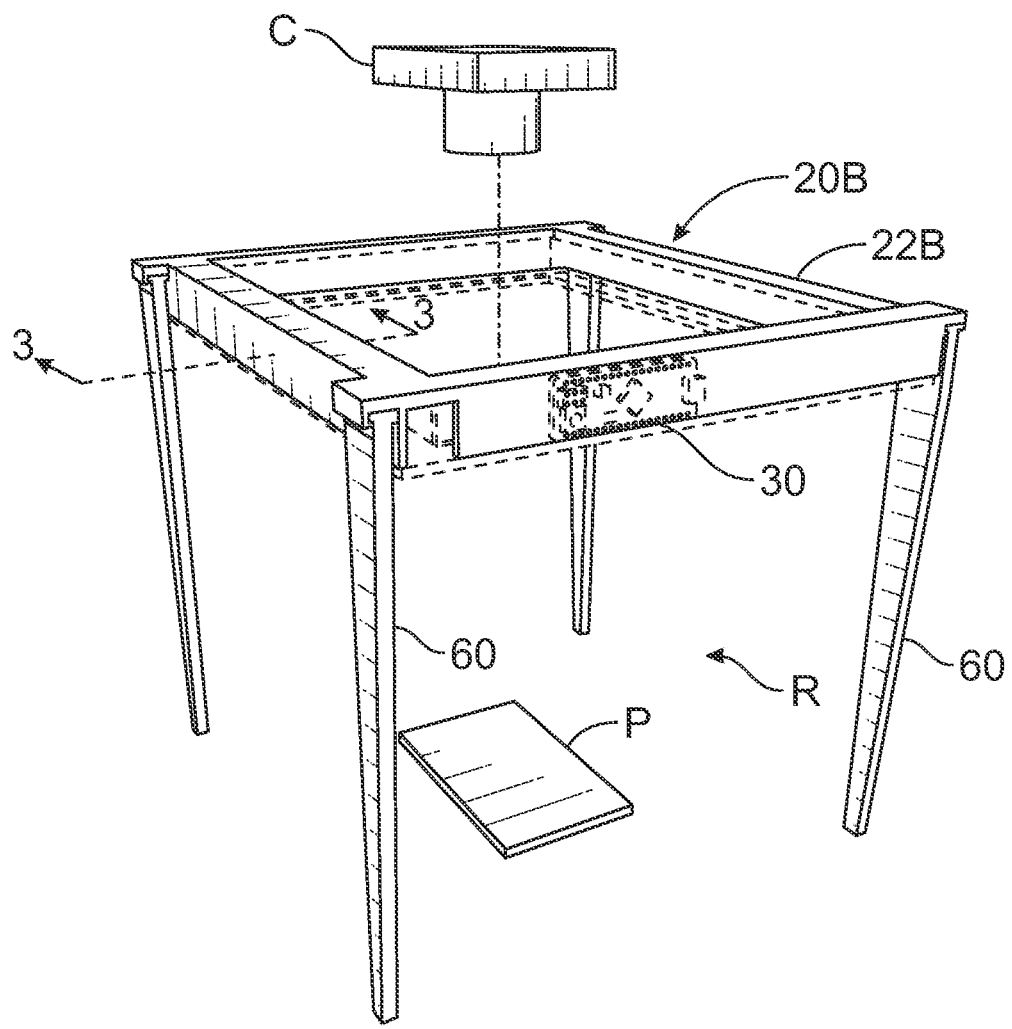
FIG. 7 is a perspective of a light rig assembly in combination with a camera according to disclosed embodiments.
Figure 8:
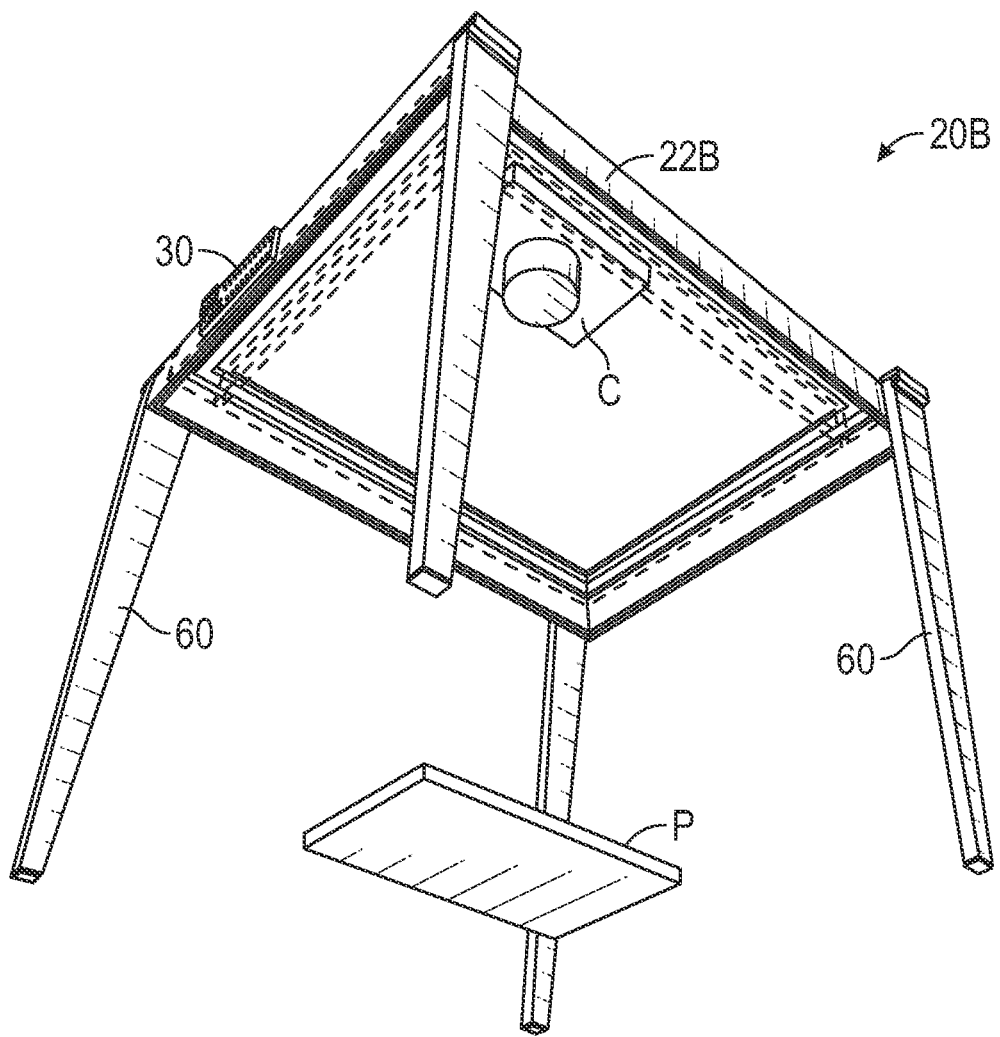
FIG. 8 is a perspective of a light rig assembly in combination with a camera according to disclosed embodiments.
Figure 9:
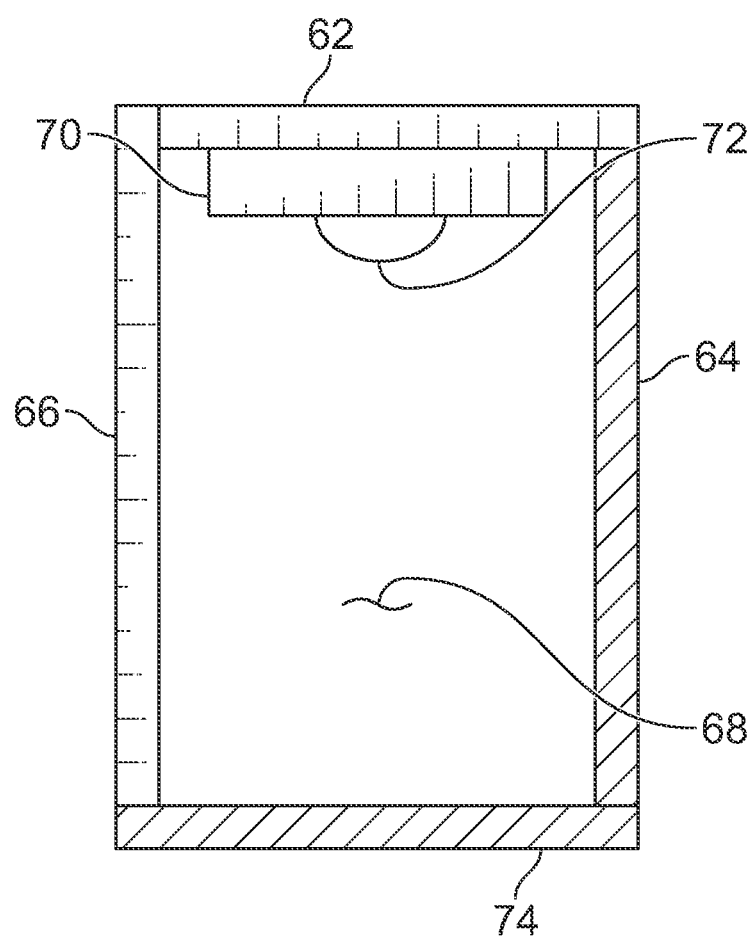
FIG. 9 is a cross section of a frame of the light rig assembly of FIG. 8 taken in the plane of line 3-3 of FIG. 8.

FIGS. 7-9 show an example embodiment of the lighting apparatus as a light rig assembly 20B. As seen in FIGS. 7 and 8, in some embodiments, the light rig assembly 20B can include an elevated rectangular frame 22B mounted on selectively removeable legs 60 and the microcontroller 30. In some embodiments, the light rig assembly 20B can be 3D printed using a 3D printer having polylactic acid (PLA) filament. Furthermore, as shown in FIG. 9, each side of the frame 22B can include an open rectangular cross section formed by an opaque top 62 and opposite inner and outer side walls 64 and 66, which can define an elongated opening 68. In some embodiments, the inner side wall 64 can be translucent and the outer side wall 66 can be opaque. RGBW LED strips 70 can be mounted on the top 62 inside the opening 68, and a translucent rectangular diffuser 74 can span the lower edges of the inner and outer side walls 64 and 66 to soften the light emitted from the light rig assembly 20B. In some embodiments, translucent rectangular diffuser 74 can be 3D printed.

In some embodiments, the RGBW LED strips 70 can comprise a plurality of light emitting diodes 72 positioned at regular intervals. In some embodiments, the plurality of LEDs 72 can comprise approximately 144 LEDs per meter and include over 100-120 RGBW LEDs. In some embodiments, the RGBW LED strips 70 can include Adafruit® RGBW LED light strips. Adafruit is federally registered trademarks of Adafruit Industries of New York, N.Y. It is envisioned that other RGBW LED arrangements that include a similar or higher LED density can also be used. In some embodiments, each of the plurality of LEDs 72 can include a pure white LED.

Furthermore, as seen in FIGS. 7 and 8 the camera C can be centered above the frame 22B in a position for capturing the sequence of images used in animating an approximate rendering of a generally planar product P (e.g., a card or collectible) centered between lower ends of the legs 60. As may be appreciated, the selectively removeable legs 60 can be removed and replaced with alternative legs having a different length to change a height at which the frame 22B and LEDs 72 are elevated above the product P. Likewise, the height at which the camera C is positioned above the product P may also be altered by adjusting or changing a support thereof (not shown). Accordingly, the position of the light rig assembly 20B relative to the camera C may be selectively adjusted to provide a preferred lighting setup for the product P. Similar to the light ring assembly 20A of FIGS. 1-4, in some embodiments, the frame 22B can define the illumination region R from a position above the object P. In particular, the illumination region R includes the area where light illuminated from the plurality of LEDs 72 will be directed onto the surface of the object P.

The lighting and camera setup described above can eliminate deficiencies inherent in traditional photographic methods used for generally planar products such as cards and collectibles that hide imperfections. Further, the setup can enable capturing a uniform quality video for use in a procedure for animating the cards or collectibles to provide an improved approximation of how a card or collectible looks when in a viewer's hand.

In operation, the microcontroller 30 can be configured or programmed to activate the light ring assembly 20A and/or the light rig assembly 20B to sequentially fade the LEDs 40 and/or the LEDs 72 on and off to simulate light rotating around the object O and/or the object P. In particular, as the microcontroller 30 gradually dims a first of the LEDs 40 or 72, the microcontroller gradually brightens a next LED in sequence until the dimming LED is fully off, and the brightening LED is fully lit. Then, the microcontroller 30 repeats the control for a next pair of LEDs, gradually dimming the fully lit LED and gradually brightening the next LED in the sequence. The sequence of fully energized LEDs progresses around the RGBW LED ring 22A (see e.g. direction D in FIG. 4) and the frame 22B. Thus, the microcontroller 30 causes the direction from which the objects O and P are lit to orbit in a corresponding circular or rectangular path respectively. In some embodiments, the translucent diffusers 42 and 74 can smooth any light transitions from LED to LED to assist in providing a realistic approximation of light moving around the products O and P.

Figure 10:
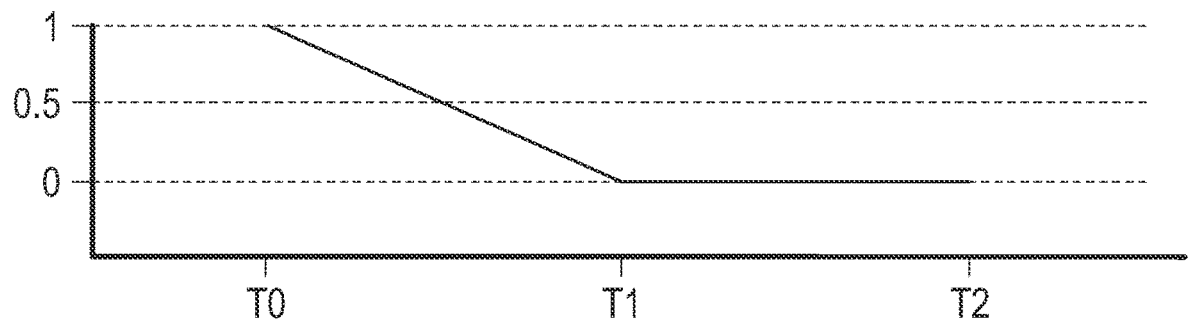
FIG. 10 is graph of brightness over time for various LEDs in a lighting assembly according to disclosed embodiments.
Figure 10:
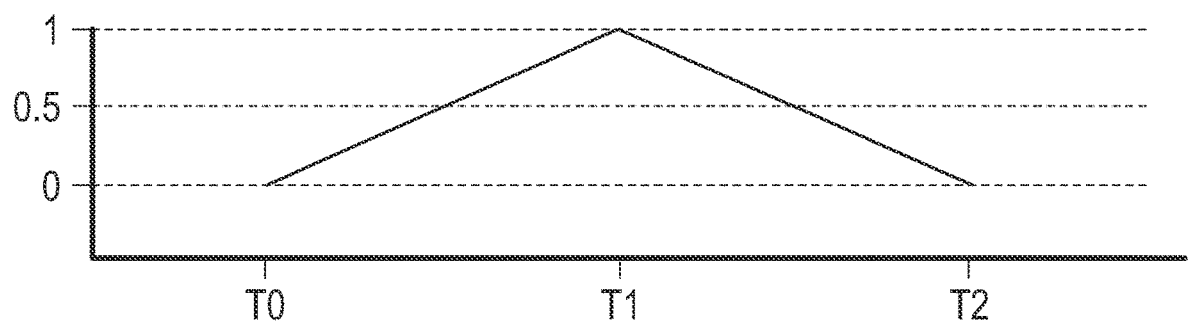
Figure 10:
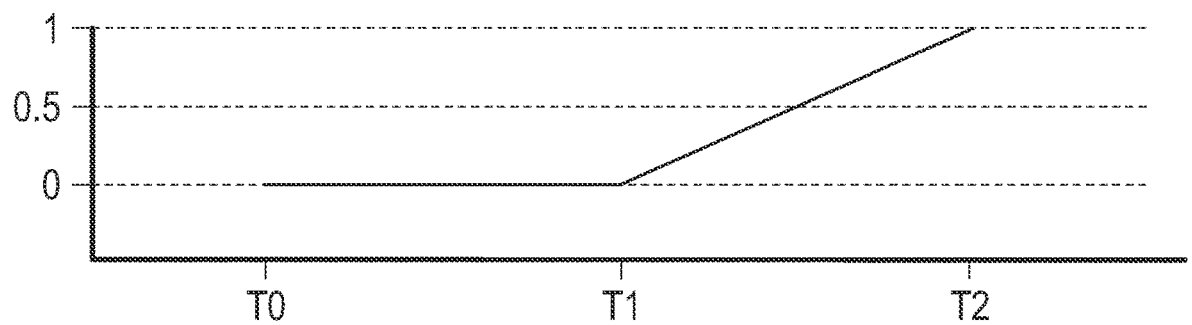

In some embodiments, the microcontroller 30 can be configured to control a different number of active ones of the plurality of LEDs 40 and 72 at once in the sequential operation to produce the rotational effect. For example, in some embodiments the microcontroller can be configured to control 2 LEDs at once and in other embodiments can be configured to control 4 LEDs at once. In particular, FIG. 10 shows a graph of brightness over time for three sequentially ordered and adjacent LEDS 1, 2, and 3 of the LEDs 40 and 72 in a lighting assembly according to disclosed embodiments where the microcontroller 30 controls 2 LEDs at once. As seen in FIG. 10, at a time T0, LED 1 is at a maximum brightness and LEDs 2 and 3 are off. Then, as time progresses from T0 to T1, the microcontroller 30 can be configured to dim the LED 1 from a fully on maximum brightness at T0 to fully off at T1 while brightening or energizing the LED 2 from fully off at T0 to the fully on maximum brightness at T1. Next, once the LED 1 reaches fully off at T1, the microcontroller 30 can be configured to switch from controlling the LED 1 to controlling the LED 3 such that from the time T1 to T2 the microcontroller 30 can be configured to dim the LED 2 from a fully on maximum brightness at T1 to fully off at T2 while brightening or energizing the LED 3 from fully off at T1 to the fully on maximum brightness at T2. Finally, the microcontroller 30 can be configured to repeat this sequential process on all of the LEDs 40 and 72 for a preconfigured amount of time periods sufficient to simulate the rotation of light around the objects O and P at least one full rotation. In some embodiments, the preconfigured amount of time periods can be sufficient to simulate the rotation of light around the objects O and P at least two full rotations. Furthermore, in some embodiments, the microcontroller 30 can be configured to modify the length of each time period to speed up or slow down a speed of the simulated light rotation around the objects O and P.

Figure 11:
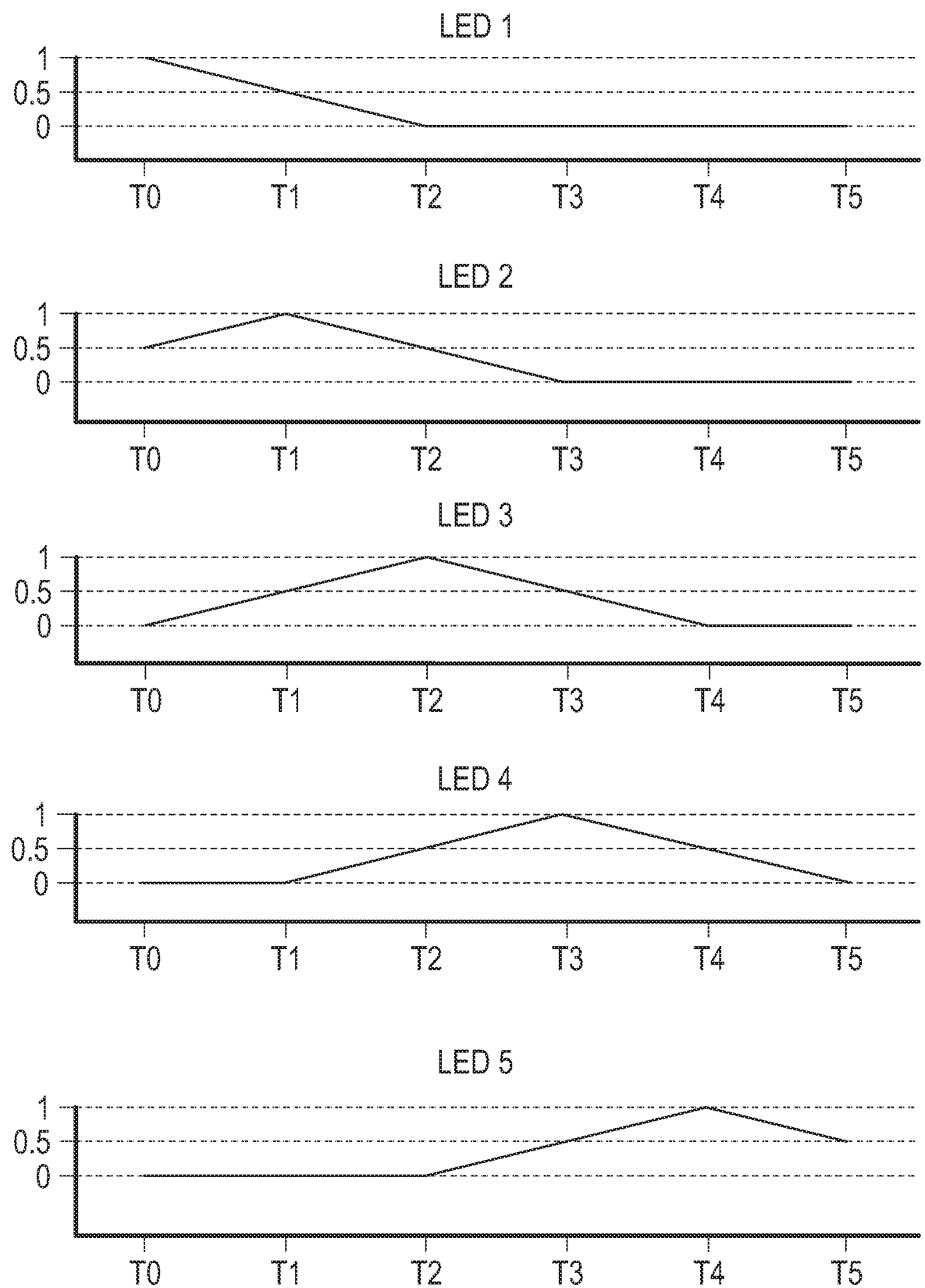
FIG. 11 is graph of brightness over time for various LEDs in a lighting assembly according to disclosed embodiments.

Similar to FIG. 10, FIG. 11 shows a graph of brightness over time for five sequentially ordered and adjacent LEDS 1, 2, 3, 4, and 5, of the LEDs 40 and 72 in a lighting assembly according to disclosed embodiments where the microcontroller 30 controls 4 LEDs at once. As seen in FIG. 11, at a time T0, LED 1 is at a maximum brightness, LED 2 is at an intermediate brightness such as halfway brightened or energized, and LEDs 3, 4, and 5 are off. Then, as time progresses from T0 to T1, the microcontroller 30 can be configured to dim the LED 1 from a fully on maximum brightness at T0 to an intermediate brightness at T1 while brightening or energizing the LED 2 from the intermediate brightness at T0 to the fully on maximum brightness at T1 and brightening or energizing the LED 3 from fully off at T0 to the intermediate brightness at T1. Next, from time T1 to T2, the microcontroller 30 can be configured to begin controlling the LED 4 along with LEDs 1, 2, and 3 such that from the time T1 to T2 the microcontroller 30 can be configured to dim the LED 1 from the intermediate brightness at T1 to fully off at T2, dim the LED 2 from the fully on maximum brightness at T1 to the intermediate brightness at T2 while brightening or energizing the LED 3 from the intermediate brightness at T1 to the fully on maximum brightness at T2 and brightening or energizing the LED 4 from fully off at T1 to the intermediate brightness at T2. Then, from time T2 to T3, the microcontroller 30 can be configured to stop controlling the LED 1 and begin controlling the LED 5 along with LEDs 2, 3, and 4 such that from the time T2 to T3 the microcontroller 30 can be configured to dim the LED 2 from the intermediate brightness at T2 to fully off at T3, dim the LED 3 from the fully on maximum brightness at T2 to the intermediate brightness at T3 while brightening or energizing the LED 4 from the intermediate brightness at T2 to the fully on maximum brightness at T3 and brightening or energizing the LED 5 from fully off at T2 to the intermediate brightness at T3. Finally, as seen in FIG. 11, the microcontroller 30 can be configured to repeat this sequential process on all of the LEDs 40 and 72 for a preconfigured amount of time periods, including the time periods between T3 and T4 and between T4 and T5, sufficient to simulate the rotation of light around the objects O and P at least one full rotation. In some embodiments, the preconfigured amount of time periods can be sufficient to simulate the rotation of light around the objects O and P at least two full rotations.

It should be noted that while FIGS. 10 and 11 show a linear transition in brightness of the LEDs 40 and 72 over time, other embodiments employing non-linear brightness transitions are also contemplated. Furthermore, various other embodiments where the microcontroller 30 simultaneously controls an amount of LEDS different from 2 and 4 are also contemplated. Finally, in some embodiments, the LEDs 40 and 72 of the light ring assembly 20A and/or the light rig assembly 20B can be substituted for one or more LEDs that the microcontroller 30 can direct to physically move around the light ring assembly 20A and/or the light rig assembly 20B to produce the light rotation effect on the surfaces of the objects O and P. Furthermore, in some embodiments, the microcontroller 30 can be configured to modify the length of each time period to speed up or slow down a speed of the simulated light rotation around the objects O and P.

As described herein, the light ring assembly 20A and/or the light rig assembly 20B can be used in methods that facilitate creation of files depicting an animated approximation of the objects O and P. For example, such methods can include positioning the objects O and P within illumination regions R of the light ring assembly 20A and/or the light rig assembly 20B such that a first surface of the objects O and P is approximately parallel to the focus plane of the camera C. Then, the methods can include activating the light ring assembly 20A and/or the light rig assembly 20B with the microcontroller 30 to rotate light around the first surfaces as described herein. The methods can also include capturing first sequences of images of the first surfaces of the objects O and P with the camera C while the light ring assembly 20A and/or the light rig assembly 20B are activated.

In some embodiments, after capturing the first sequences of images of the first surfaces, the methods can include repositioning the objects O and P within the illumination regions R such that second surfaces of the object are approximately parallel to the focus plane of the camera C, again activating the light ring assembly 20A and/or the light rig assembly 20B with the microcontroller 30, and capturing second sequences of images of the second surfaces. In some embodiments, the second surfaces can be opposite the first surfaces on the objects O and P.

In some embodiments, the first and/or second sequences of images can include ultra-high-resolution (e.g., 4K resolution taken at 30 frames per second (FPS) or better) videos. In some embodiments, higher resolution videos such as 8K can also be used.

Figure 12:
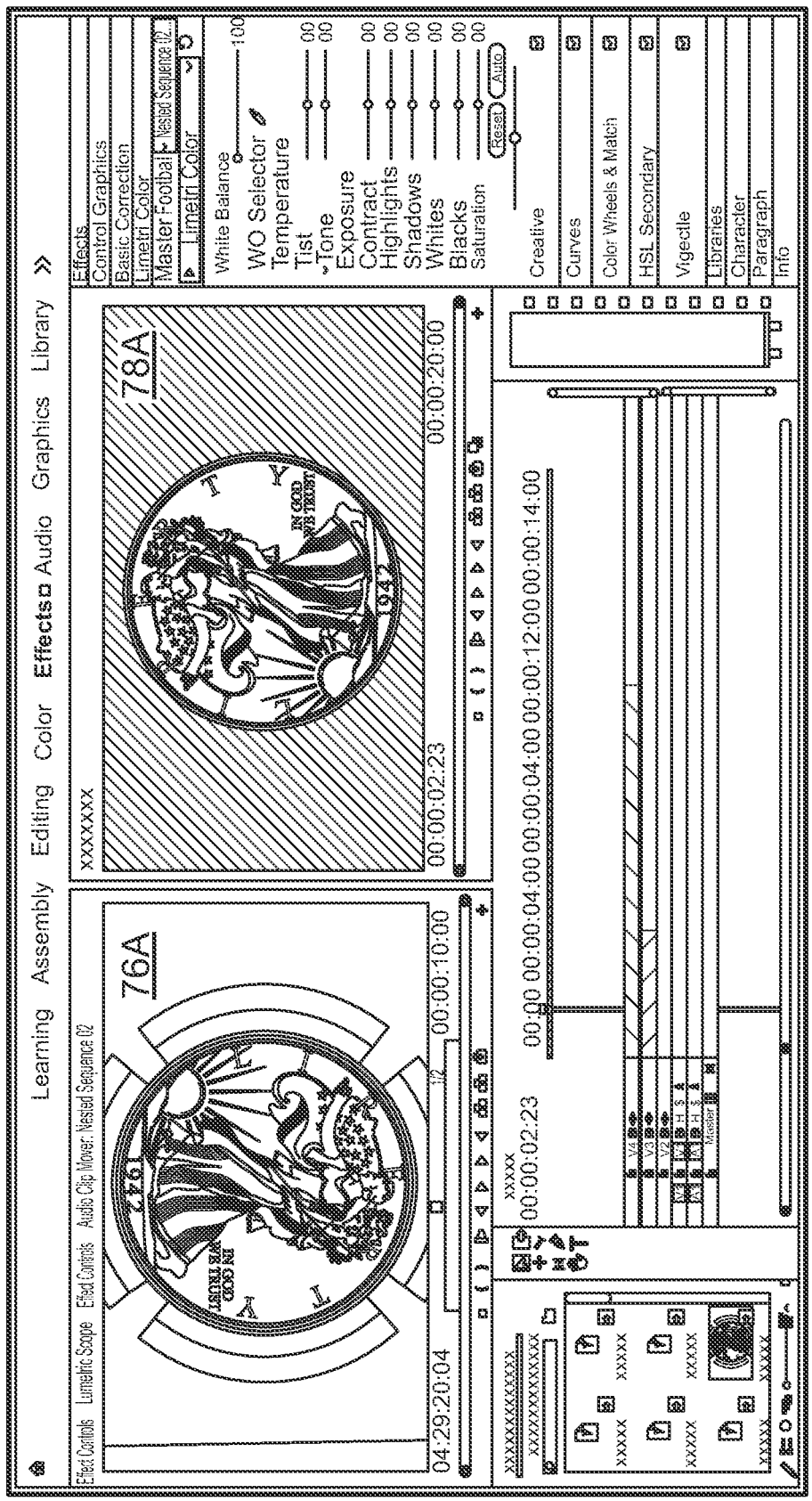
FIGS. 12 and 13 are a graphical user interface within video editing software used during a "Stage 1" video creation process according to disclosed embodiments.
Figure 13:
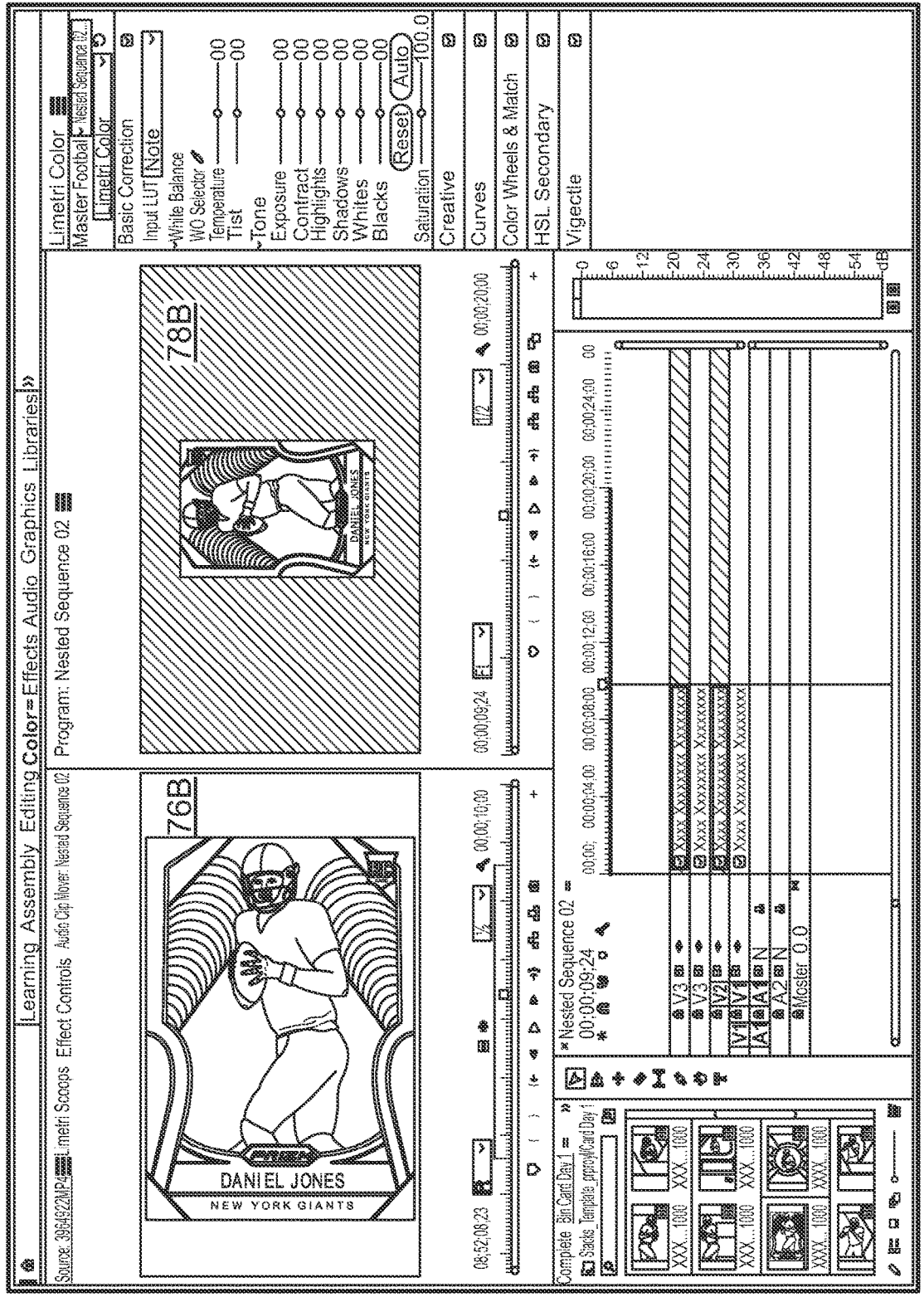
Figure 14:
FIGS. 14 and 15 are a graphical user interface within video editing software showing collectible objects masked off with a black background according to disclosed embodiments.
Figure 15:
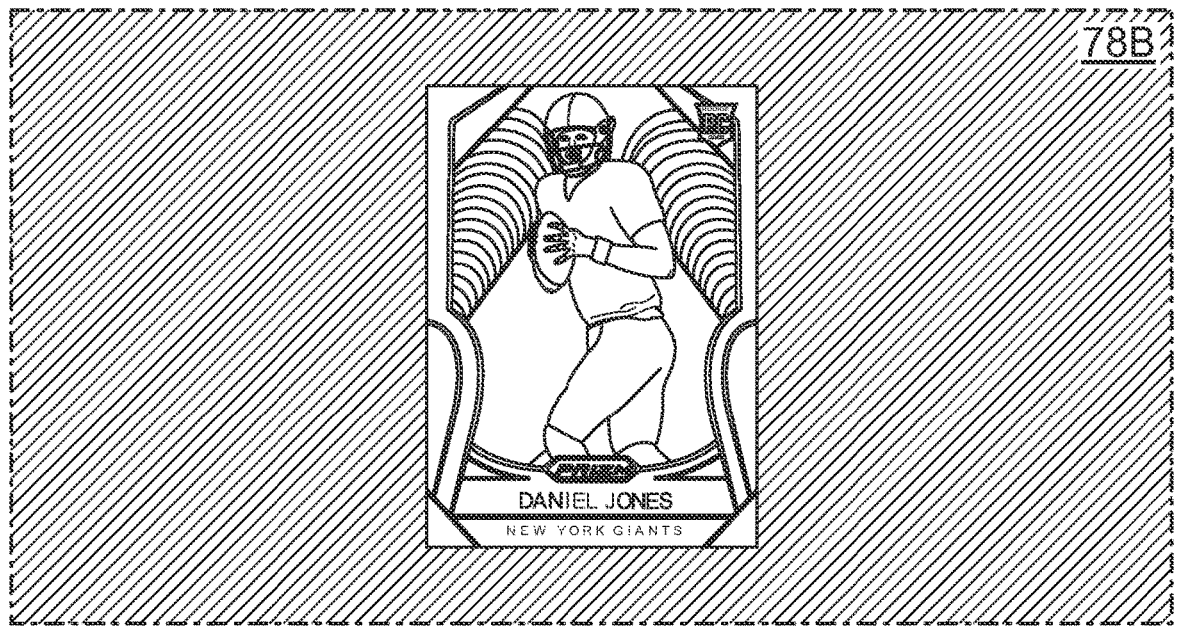

After capturing the first sequences and/or second sequences of images, the methods can include importing those sequences of images into "stage I" or first stage video files having a preconfigured size and masked off such that the first surface appears over a first background. For example, FIG. 12 shows a graphical user interface display where a sequences of images 76A of the object O (e.g. a coin) captured by the camera C in the light ring assembly 20A are processed to mask off the background and generate a first stage video file 78A shown also in FIG. 14. Similarly, FIG. 13 shows a graphical user interface display where a sequences of images 76B of the object P (e.g. a card) captured by the camera C in the light rig assembly 20B are processed to mask off the background and generate a first stage video file 78B shown also in FIG. 15. In some embodiments, additional video post processing (white balance, color and brightness, etc.) can be performed when the first stage video files are created. Processing the sequence of images into the first stage video files can ensure that every animation output by these methods has a consistent size and enables this step of the animation process to be automatically performed by a programable processor. In some embodiments, the first stage video files can be exported in a resolution of at least 3840×2160 pixels. In some embodiments, the first stage video files can be formed using off the shelf video editing software such as Adobe Premiere or its equivalents. Adobe Premiere® is a federally registered trademark of Adobe Inc. of San Jose, Calif.

In some embodiments, the second sequence of images of second surfaces of the objects O and P can be imported into the first stage video files 78A and 78B after the first sequence of images 76A and 76B. In these embodiments, the second surfaces can appear over the first background in the location of the first surfaces within the first stage video files 78A and 78B. In some embodiments, the transitions in the first stage video files 78A and 78B between the first surface and the second surface can be smoothed out with a small time overlap in the images and include an approximate alignment of any light reflections on the first and second surfaces. In some embodiments, each of the first and second sequences of images can be approximately 10 seconds and any overlap can be approximately one second. However, different lengths for each of these portions of the first stage video files are also contemplated.

After generating the first stage video files such as the first stage video files 78A and 78B, the methods can include incorporating the first stage video files into templates of a three-dimensional (3D) model by aligning the first surface with a video mask of the template such that the video mask obscures the first background of the first stage video file and superimposes a location of the first surface in the first stage video file onto a virtual surface of the 3D model. In some embodiments, the templates can be selected such that the 3D models therein approximately match the shapes of the objects O and P.

In some embodiments, the 3D model can be configured in the template to cast shadows onto a second background of the template as the 3D model is rotated relative to the second background. For example, FIGS. 16 and 17 show the first stage video files 78A and 78B of the objects O and P mapped on to corresponding 3D models in a 3D scene having a 3D environment background color B (generally white), a 3D light T casting shadows S from the 3D model to the background but not affecting the background so the background can remain the desired background color, and a 3D camera viewpoint V to adjust the view in which to render the files output by the method.

Figure 16:
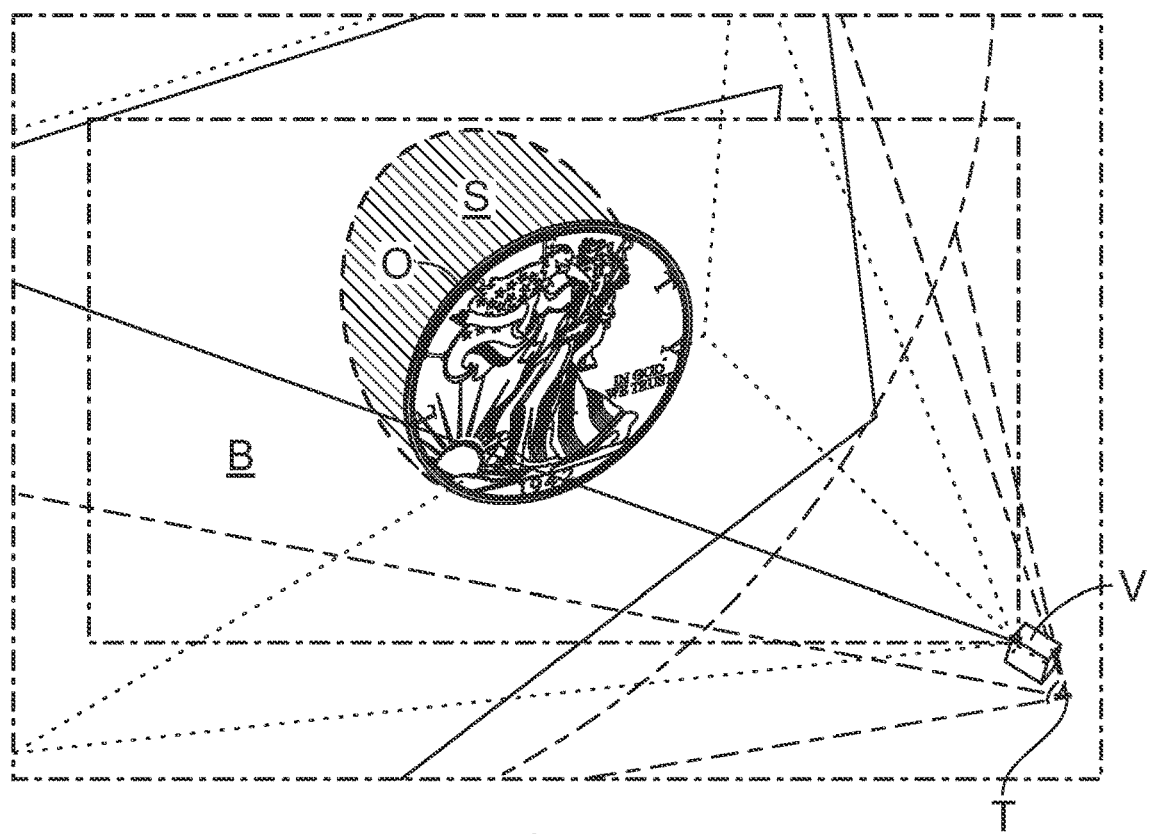
FIGS. 16 and 17 are a graphical user interface within video editing software showing collectible objects during animation according to disclosed embodiments.
Figure 17:
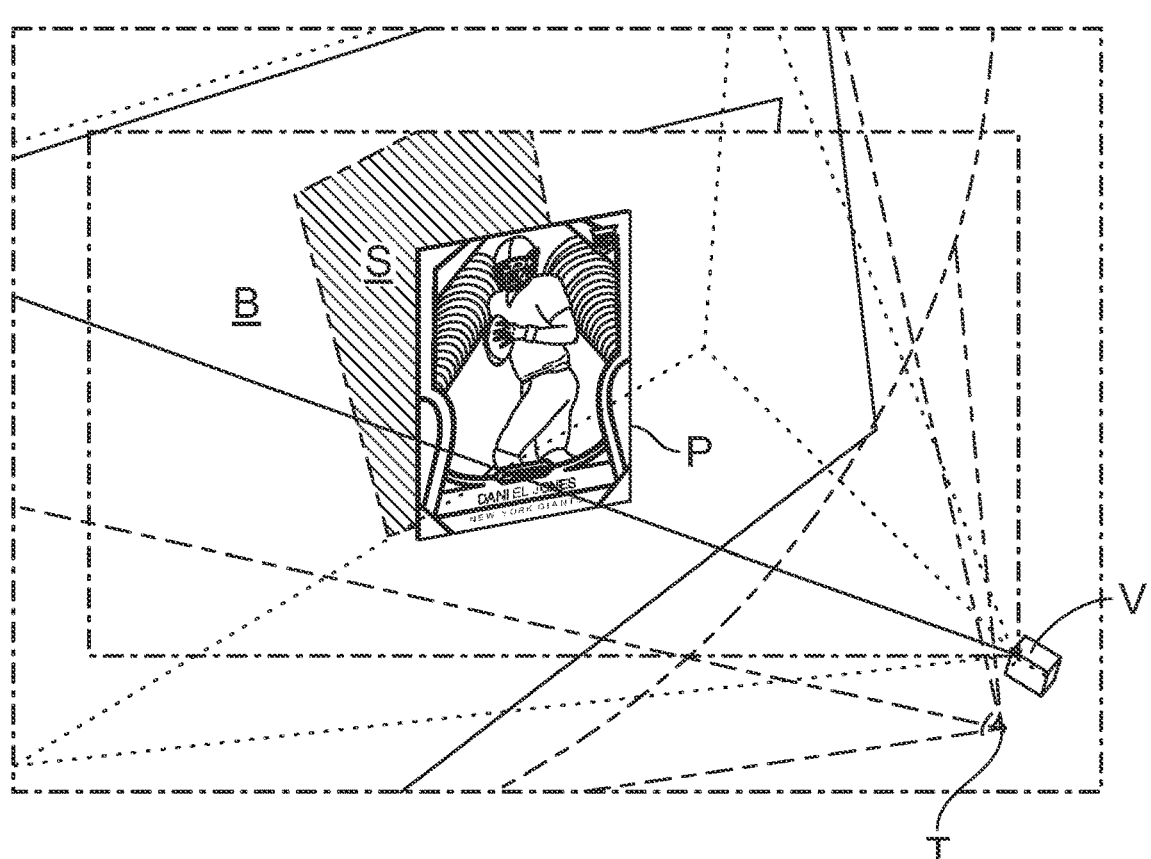

As seen in FIGS. 16 and 17, when the first stage video files are then taken into the 3D editing environment where they are incorporated with the templates, the 3D models can be vertically positioned on their edges with the solid background colors B. The 3D model can then be animated to rotate a specified number of degrees as the 3D light source T casts the realistic shadows S from the 3D models onto the backgrounds. The shadows S can naturally change as the 3D model is rotated under the 3D light T. The rotation, speed, and direction can all be changed as needed. Furthermore, in some embodiments, a video mask can be created to mask out the black background from the first stage video files and then applied to virtual surfaces of the 3D models as a video texture. The video mask can be various shapes and sizes that match the shapes and sizes of the objects O and P. For example, the video mask for the object O can include a circle, the video mask for the object P can be a rectangle. However, the video mask can be custom made to fit any shape including non-round coins or medals. The video masks cast the perfectly rendered 3D shadow S onto the background as the 3D model rotates. The rotation of the 3D model combined with the video texture created from rotating light in the first stage video files from the light ring assembly 20A and/or the light rig assembly 20B can result in a realistic effect that provides a good approximation of in hand appearance. Furthermore, in some embodiments, the background colors B can be set to accept the shadows S from the 3D model, but not to accept light from the 3D light source T causing the shadows S of the coin to be shown on the background as it rotates while the rest of the background in the animation remains the selected color.

In some embodiments, rotation of the light as seen on the first surfaces in the first stage video files can be aligned with rotation of the shadows when incorporating the first stage video files into the templates. Similarly, in some embodiments, rotation of the 3D models within the templates can be limited to ensure the best possible match and alignment between the shadows S and the light redefected on the first and/or second surfaces. For example, in some embodiments, rotation of the 3D model can be limited to along the Y-axis in 3D space and further limited to a range of approximately less than 50 degrees. In some embodiments, the range of rotation can be limited from approximately 20 degrees to −20 degrees over a 10 second time frame along the Y axis.

After the first stage video files are combined with the templates, the methods can include output the combined first stage video file and template as the files depicting the animated approximations of the object O and P. In some embodiments, the outputted file can include a digital 3D object file. Additionally or alternatively, in some embodiments, the outputted file can include a video file. For example, in some embodiments, the outputted file can include a compressed H.264 video mp4 format file that can be used on websites, television broadcasts, or mobile devices. In some embodiments, the resulting animations can also be integrated into an official product itself where scanning or looking up the product can display the animation of the product. One example use could include a product unboxing video live stream.

Figure 18:
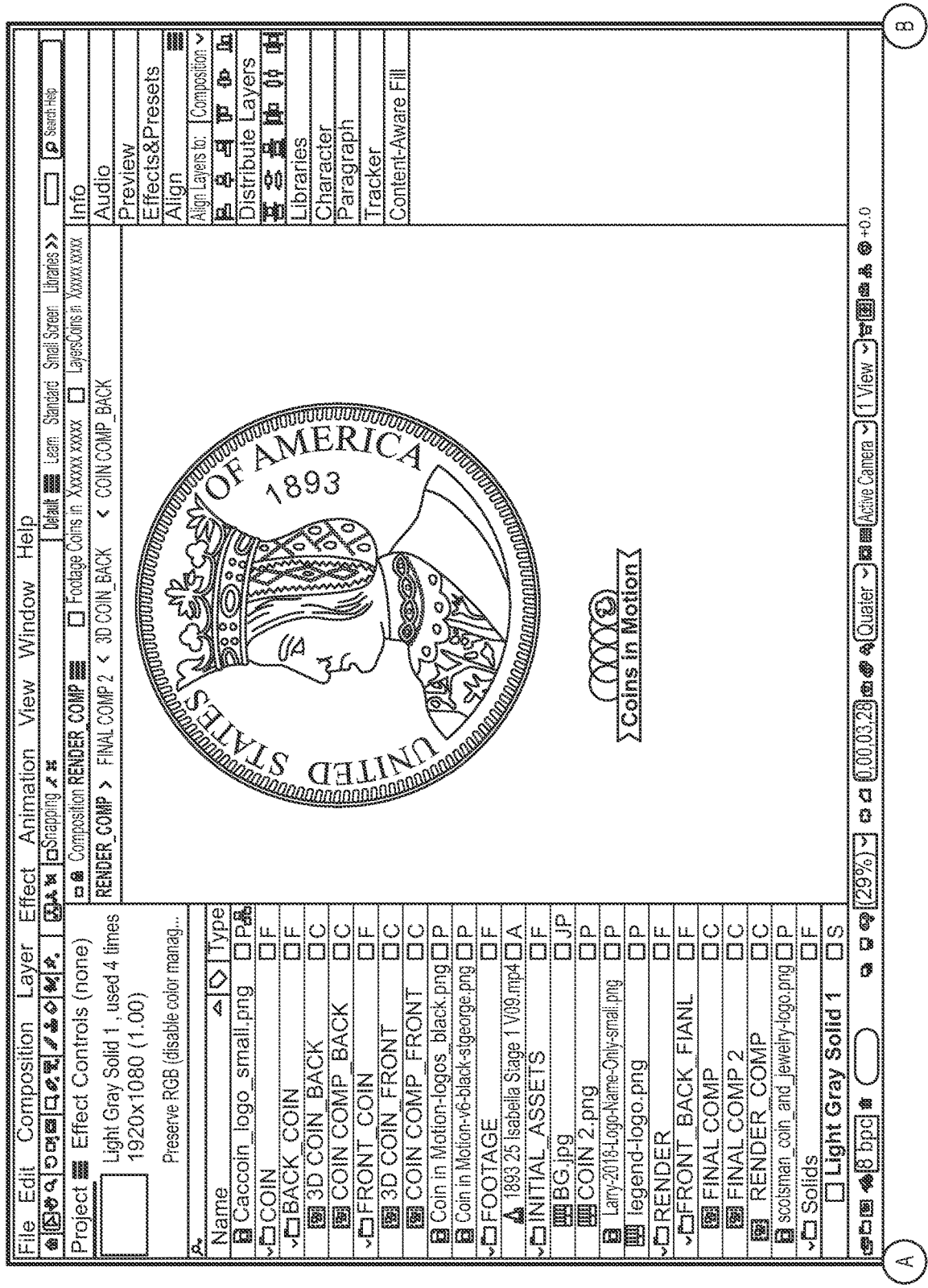
FIGS. 18 and 19 are a graphical user interface within video editing software showing a final rendering of an animation according to disclosed embodiments.
Figure 18:
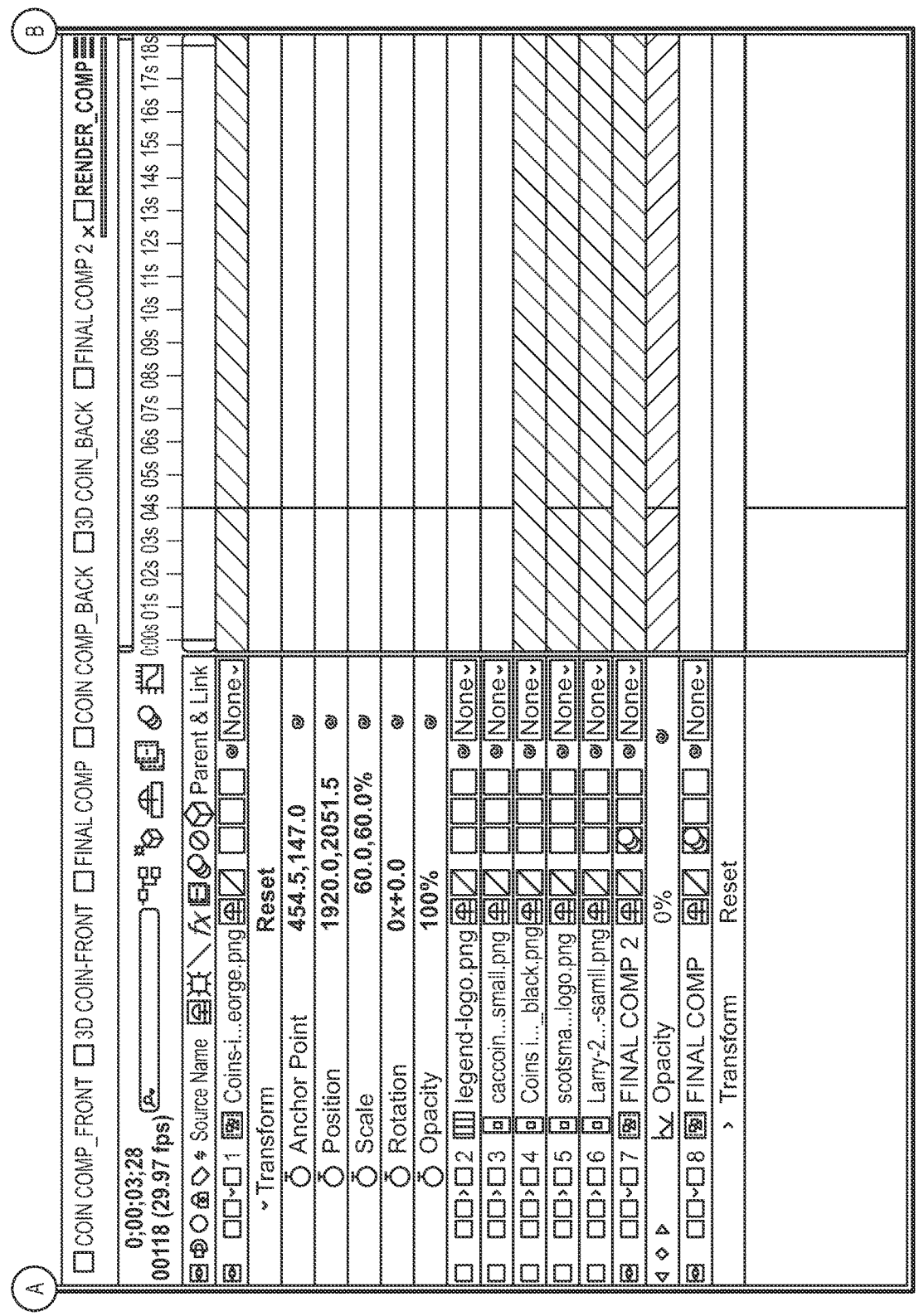
Figure 19:
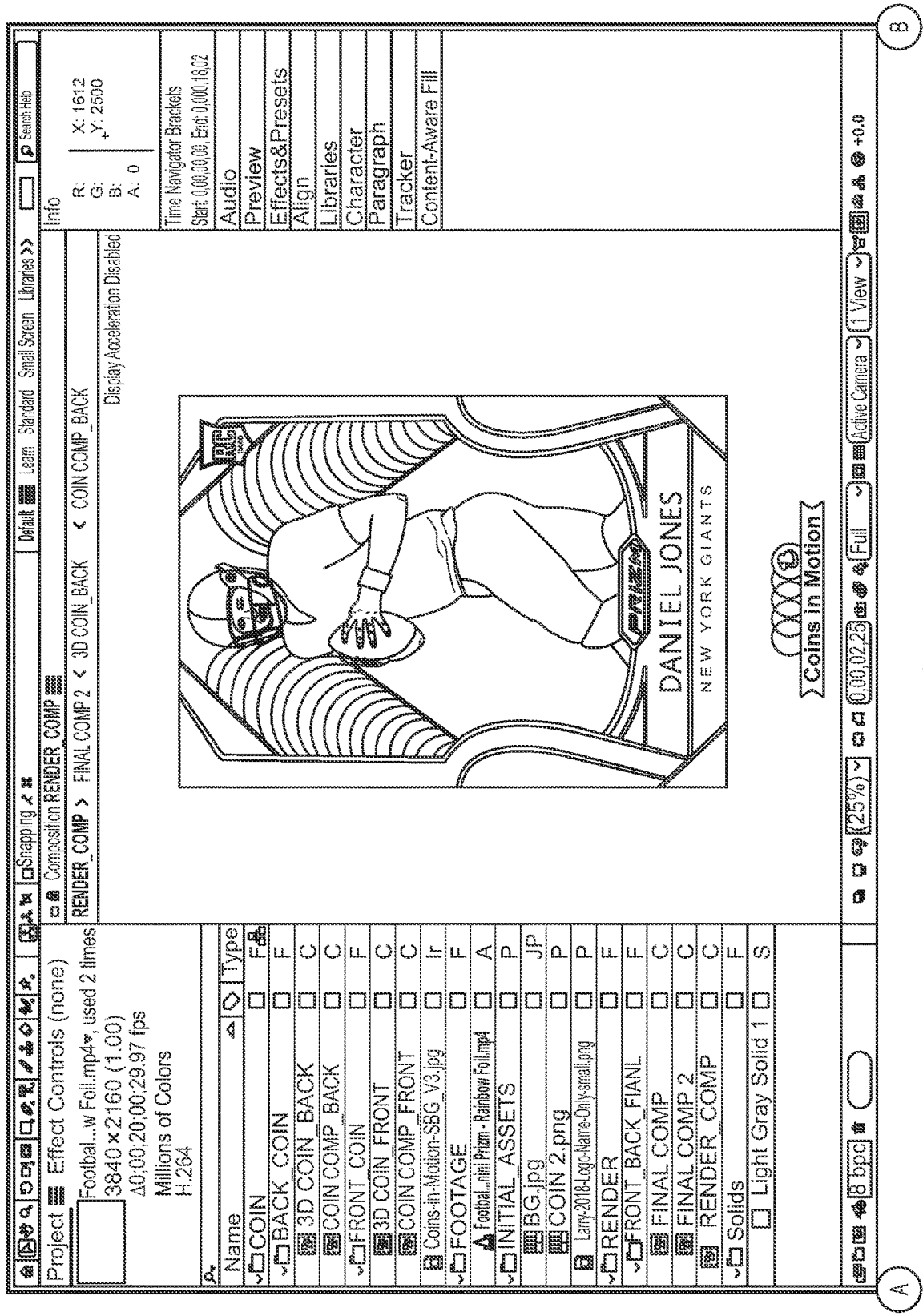
Figure 19:
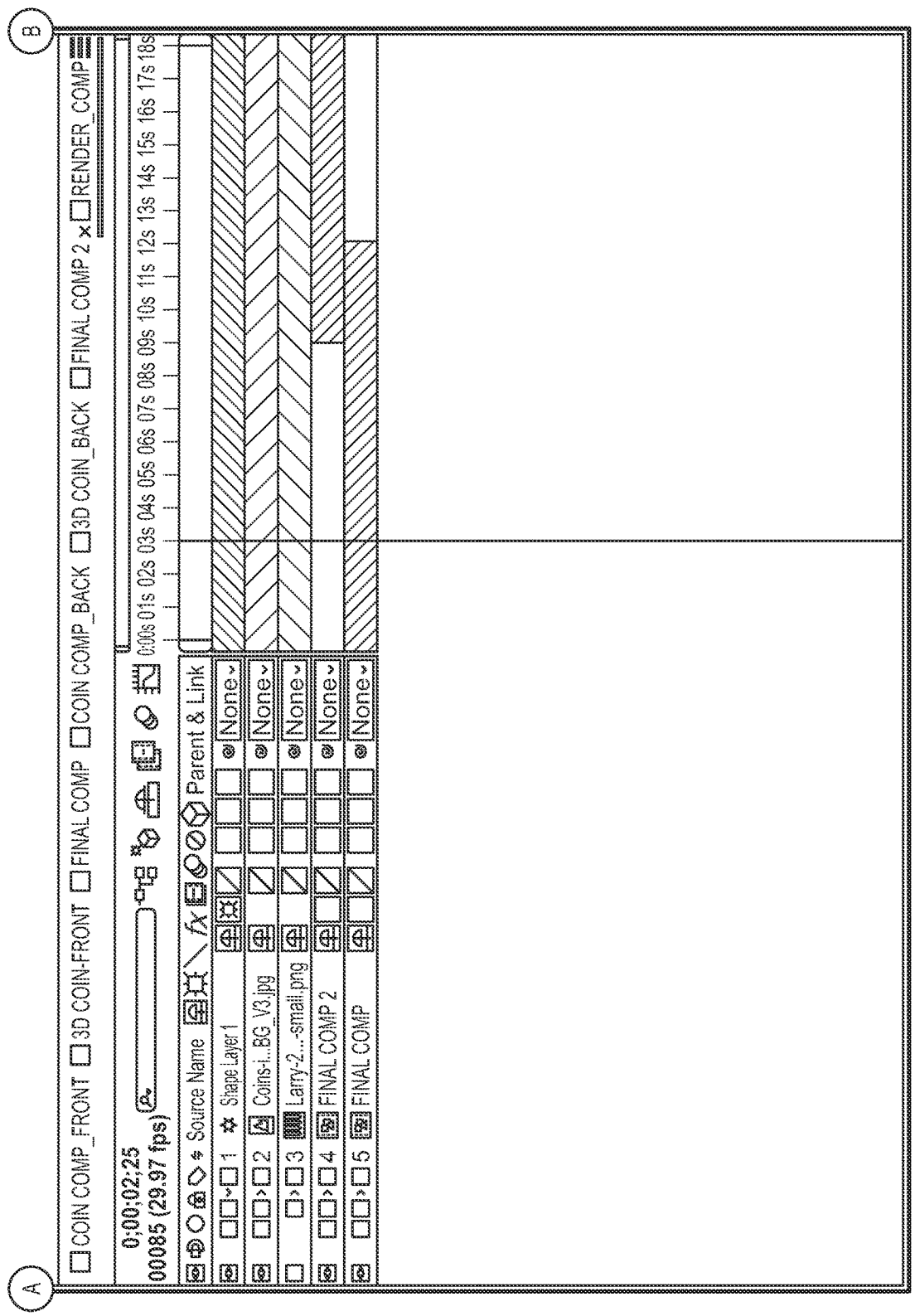

In some embodiments, the after the first stage video files are combined with the templates, the combined first stage video files and templates can be passed to a 3D video editing software for final rendering of the final file output by the methods. For example, as seen in FIGS. 18 and 19, the 3D video editing software can be used to add logos, modify the background color B, and/or change the video masks in the combined first stage video files and templates. In some embodiments, the 3D video editing software can include After Effects® or the like. After Effects is a federally registered trademark of Adobe Inc.

Figure 20:
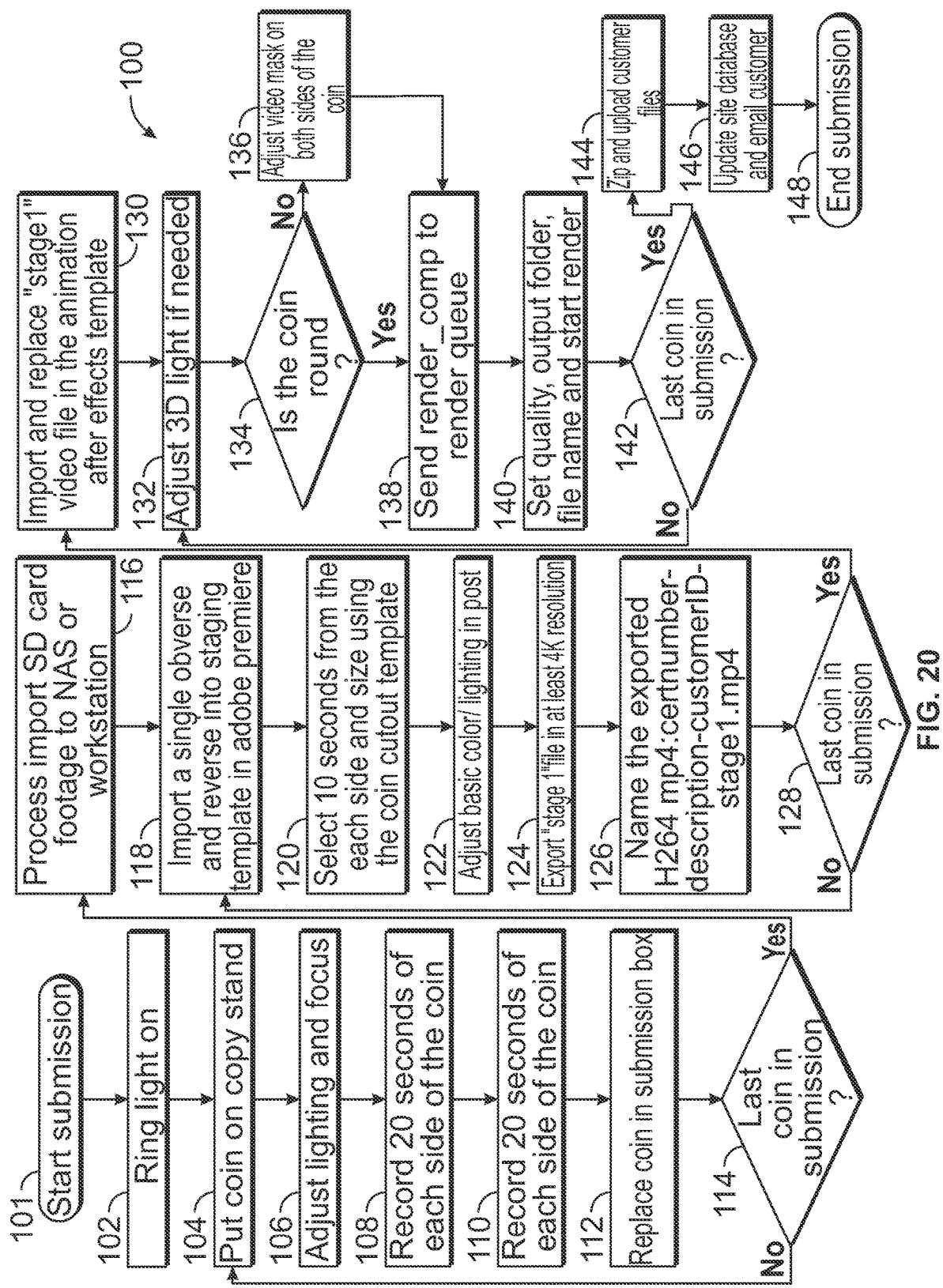
FIGS. 20 and 21 are flowcharts illustrating methods of preparing an animated approximation according to disclosed embodiments.

FIG. 20 shows a flow diagram of a method 100 for animating a collectable coin according to disclosed embodiments. As seen in FIG. 20, the method 100 can include starting a submission and activating the ring light assembly 22A as in 101 and 102. Then, the method 100 can include placing the coin on a stand, adjusting a focus of the camera C, recording 20 seconds of video of each side of the coin twice and replacing the coin in its submission box, as in steps 104-112. Then, the method 100 can include determining whether the current coin is a last submission, as in 114. When the coin is not the last submission, the method 100 can include placing a next coin on the stand and repeating steps 104-114.

However, when the current coin is the last submission, the method 100 can include processing the video files from the camera C into a workstation, importing a single obverse and reverse side of a coin into a video editing platform, selecting 10 seconds from each side of the coin, sizing the video file, adjusting the color and/or lighting, exporting a stage 1 video file of the coin in at least a 4K resolution, and naming the exported file according to a customer naming convention and description as in steps 116-126. Then, the method 100 can include determining whether the current coin video being processed is the last submission, as in 128. When, the current coin video is not the last submission to be processed, the method 100 can include placing repeating steps 118-128 on a next coin video.

However, when the current coin video is the last video to be processed, the method 100 can include importing the stage 1 video files into a 3D animation template and adjusting the 3D lighting effects as needed, as in 130 and 132. Then, the method 100 can include determining whether the coin is round, as in 134. When the coin is not round, the method 100 can include adjusting a video mask, as in 106. In any event, when the coin is round or the video mask has been adjusted, the method 100 can include sending a render composition to a render queue and setting the render quality, an output folder, a file name, and starting the render, as in 138 and 140. Then, the method 100 can include determining whether the current 3D coin render is a last to be processed, as in 142. When the current 3D coin render is not the last to be processed, the method 100 can include repeating steps 132-142. However, when the current 3D coin render is the last to be processed, the method 100 can include zipping together all of the 3D rendered file, updating a site database, emailing the customer, and ending the submission process, as in steps 144-148.

Figure 21:
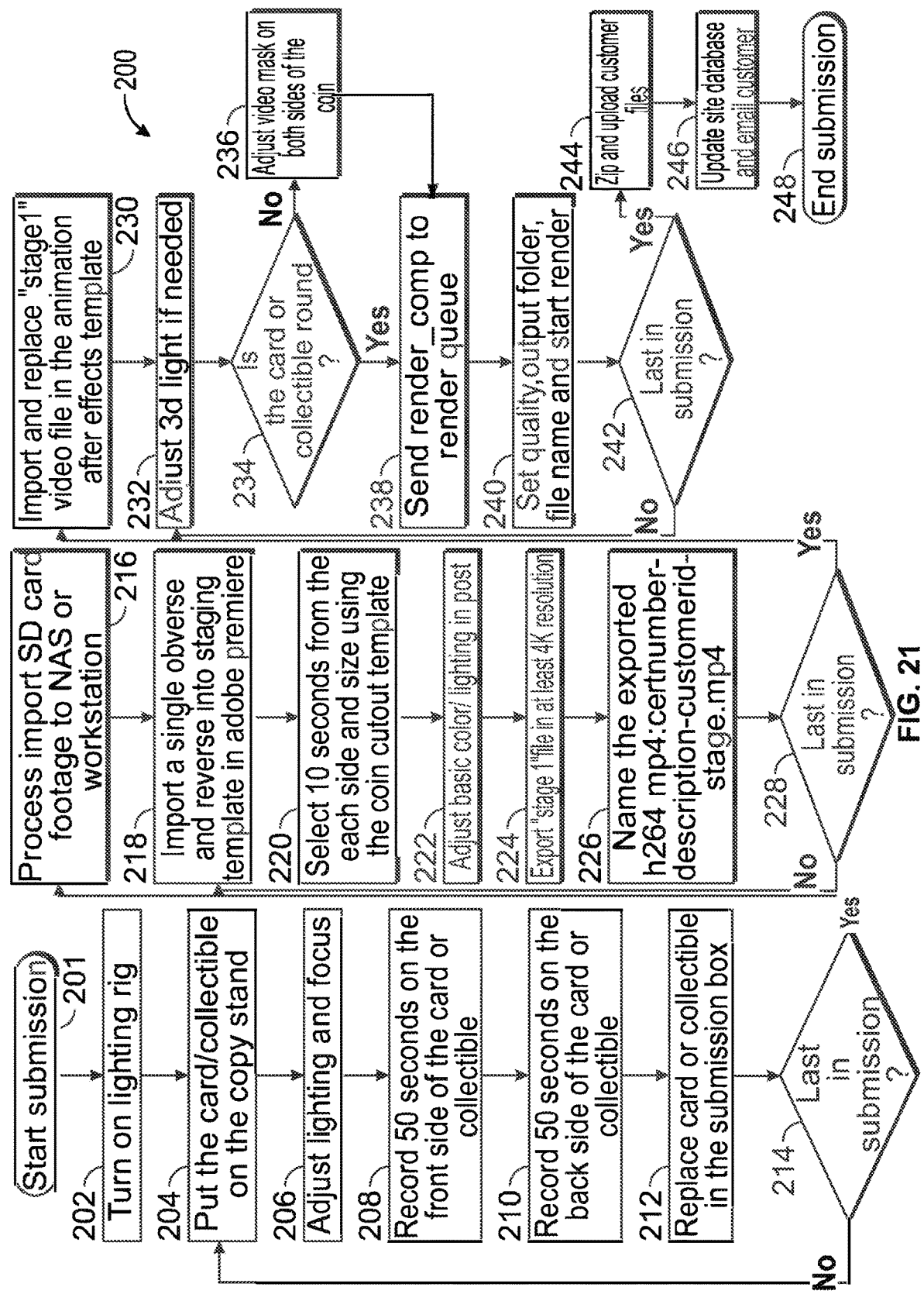

FIG. 21 shows a flow diagram of a method 200 for animating a collectable card according to disclosed embodiments. As seen in FIG. 21, the method 200 is similar to the method 100 and can include starting a submission and activating the light rig assembly 22B as in 201 and 202. Then, the method 200 can include placing the card on a stand, adjusting a focus of the camera C, recording 50 seconds of video of each side of the card twice and replacing the card in its submission box, as in steps 204-112. Then, the method 200 can include determining whether the current card is a last submission, as in 214. When the card is not the last submission, the method 200 can include placing a next card on the stand and repeating steps 204-214.

However, when the current card is the last submission, the method 200 can include processing the video files from the camera C into a workstation, importing a single obverse and reverse side of a card into a video editing platform, selecting 10 seconds from each side of the card, sizing the video file, adjusting the color and/or lighting, exporting a stage 1 video file of the card in at least a 4K resolution, and naming the exported file according to a customer naming convention and description as in steps 216-226. Then, the method 200 can include determining whether the current card video being processed is the last submission, as in 228. When, the current card video is not the last submission to be processed, the method 200 can include placing repeating steps 218-228 on a next card video.

However, when the current card video is the last video to be processed, the method 200 can include importing the stage 1 video files into a 3D animation template and adjusting the 3D lighting effects as needed, as in 230 and 232. Then, the method 200 can include determining whether the card is round, as in 234. When the card is not round, the method 200 can include adjusting a video mask, as in 236. In any event, when the card is round or the video mask has been adjusted, the method 200 can include sending a render composition to a render queue and setting the render quality, an output folder, a file name, and starting the render, as in 238 and 240. Then, the method 200 can include determining whether the current 3D card render is a last to be processed, as in 242. When the current 3D card render is not the last to be processed, the method 200 can include repeating steps 232-242. However, when the current 3D card render is the last to be processed, the method 200 can include zipping together all of the 3D rendered file, updating a site database, emailing the customer, and ending the submission process, as in steps 244-248.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method comprising:
    positioning an object within an illumination region of a lighting apparatus such that a first surface of the object is approximately parallel to a focus plane of a camera, wherein the lighting apparatus includes a plurality of light emitting elements embedded therein;
    activating the lighting apparatus to rotate light around the first surface at a first speed by first brightening and then dimming each of the plurality of light emitting elements individually in a sequenced order such that at least one of the plurality of light emitting elements is brightening when a neighboring one of the plurality of light emitting elements is dimming;
    programming the camera to capture a first sequence of images of the object according to a constant framerate setting, wherein the constant framerate setting is independent of the first speed and the first speed is independent of the constant framerate setting;
    activating the camera to capture the first sequence of images of the object while the lighting apparatus is activated;
    importing the first sequence of images into a first stage video file having a preconfigured size and masked off such that the first surface appears over a first background;
    incorporating the first stage video file into a template of a three-dimensional (3D) model by aligning the first surface with a video mask of the template such that the video mask obscures the first background of the first stage video file and superimposes a location of the first surface in the first stage video file onto a virtual surface of the 3D model, wherein the 3D model is configured in the template to cast shadows onto a second background of the template as the 3D model is rotated relative to the second background; and
    output the combined first stage video file and template as a file depicting an animated approximation of the object.

2. The method of claim 1 wherein the file depicting the animated approximation of the object includes a video file.

3. The method of claim 1 wherein the file depicting the animated approximation of the object includes a digital 3D object file.

4. The method of claim 1 further comprising:
    incorporating the first stage video file into the template of the 3D model as a video texture; and
    aligning rotation of the light broadcast from the plurality of light emitting elements and captured on the first surface in the first stage video file with rotation of the shadows when incorporating the first stage video file into the template.

5. The method of claim 1 further comprising:
    positioning the object within the illumination region such that a second surface of the object is approximately parallel to the focus plane of the camera;
    activating the lighting apparatus to rotate light around the second surface at the first speed;
    programming the camera to capture a second sequence of images of the object according to the constant framerate setting that is independent of the first speed;
    activating the camera to capture the second sequence of images of the object while the lighting apparatus is activated;
    importing the second sequence of images into the first stage video file after the first sequence of images, wherein the second surface appears over the first background in the location of the first surface within the first stage video file.

6. The method of claim 5 wherein the second surface is opposite the first surface.

7. The method of claim 1 wherein the lighting apparatus includes a ring or frame positioned above and defining the illumination region and the plurality of lighting elements include a plurality of light emitting diodes (LEDs), and wherein activating the lighting apparatus to rotate light around the first surface includes a microcontroller dimming and brightening each of the plurality of LEDs in the sequenced order around the ring or frame.

8. The method of claim 7 wherein the at least one of the plurality of light emitting elements brightening when the neighboring one of the plurality of light emitting elements is dimming includes two of the plurality of LEDs being controlled at a time such that a first of the controlled LEDs is being dimmed from fully on to fully off while a second of the controlled LEDs is being brightened from fully off to fully on, wherein the microcontroller controls the first of the controlled LEDs and the second of the controlled LEDs such that the first of the controlled LEDs reaches fully off simultaneous with the second of the controlled LEDs reaching fully on, and wherein once the first of the controlled LEDs reaches fully off and the second of the controlled LEDs reaches fully on, the microcontroller begins to dim the second of the controlled LEDs to fully off and begins to control a next one of the plurality of LEDs in the sequenced order to brighten the next one of the plurality of LEDs from fully off to fully on.

9. The method of claim 7 wherein the at least one of the plurality of light emitting elements brightening when the neighboring one of the plurality of light emitting elements is dimming includes four of the plurality of LEDs being controlled at a time such that a first and second of the controlled LEDs is being dimmed from fully on to fully off while a third and fourth of the controlled LEDs is being brightened from fully off to fully on, wherein the microcontroller controls the first, second, third, and fourth of the controlled LEDs such that the first of the controlled LEDs reaches fully off simultaneous with the third of the controlled LEDs reaching fully on and the second of the controlled LEDs reaches fully off simultaneous with the fourth of the controlled LEDs reaching fully on, and wherein once the first of the controlled LEDs reaches fully off and the third of the controlled LEDs reaches fully on, the microcontroller begins to dim the third of the controlled LEDs to fully off and begins to control a next one of the plurality of LEDs in the sequenced order to brighten the next one of the plurality of LEDs from fully off to fully on.

10. The method of claim 7 wherein the plurality of LEDs include pure white LEDs.

11. The method of claim 1 wherein the object includes a round coin and wherein the 3D model includes a shape matching the round coin.

12. The method of claim 1 wherein the object includes a rectangular card and wherein the 3D model includes a shape matching the rectangular card.

13. The method of claim 1 wherein the lighting apparatus includes a ring or frame that defines the illumination region and which is positioned above the illumination region, wherein the ring or frame includes a first exterior dimension that is large than a second exterior dimension of the object, and wherein the ring or frame includes a light diffuser positioned over the plurality of light emitting elements and configured to smooth transitions between each of the plurality of lighting elements when the lighting apparatus is activated to rotate light around the first surface.

14. A system comprising:
a camera configured to capture sequenced images according to a constant framerate setting;
a lighting apparatus that defines an illumination region and includes a plurality of light emitting elements embedded therein and mounting connectors configured to couple the camera to the lighting apparatus at a plurality of positions;
a microcontroller configured to control the lighting apparatus to rotate light around a first surface of an object placed within the illumination region at a first speed by first brightening and then dimming each of the plurality of light emitting elements individually in a sequenced order such that at least one of the plurality of light emitting elements is brightening when a neighboring one of the plurality of light emitting elements is dimming, wherein the constant framerate setting is independent of the first speed and the first speed is independent of the constant framerate setting; and
a programmable processor configured to:
receive a first sequence of images of the object, wherein the camera is configured to capture the first sequence of images at the constant framerate setting while the lighting apparatus is activated;
import the first sequence of images into a first stage video file having a preconfigured size and masked off such that the first surface appears over a first background;
incorporate the first stage video file into a template of a three-dimensional (3D) model by aligning the first surface with a video mask of the template such that the video mask obscures the first background of the first stage video file and superimposes a location of the first surface in the first stage video file onto a virtual surface of the 3D model, wherein the 3D model is configured in the template to cast shadows onto a second background of the template as the 3D model is rotated relative to the second background; and
output the combined first stage video file and template as a file depicting an animated approximation of the object.

15. The system of claim 14 wherein the lighting apparatus includes a ring or frame positioned above and defining the illumination region and the plurality of lighting elements include a plurality of light emitting diodes (LEDs), wherein the ring or frame includes a light diffuser positioned over the plurality of LEDs and configured to smooth transitions between each of the plurality of LEDs when the lighting apparatus is activated to rotate light around the first surface, and wherein the at least one of the plurality of light emitting elements brightening when the neighboring one of the plurality of light emitting elements is dimming includes a first of the plurality of LEDs being dimmed from fully on to fully off while a second of the plurality of LEDs is being brightened from fully off to fully on, wherein the microcontroller controls the first of the plurality of LEDs and the second of the plurality of LEDs such that the first of the plurality LEDs reaches fully off simultaneous with the second of the plurality LEDs reaching fully on, and wherein once the first of the plurality LEDs reaches fully off and the second of the plurality LEDs reaches fully on, the microcontroller begins to dim the second of the plurality LEDs to fully off and begins to control a next one of the plurality of LEDs in the sequenced order to brighten the next one of the plurality of LEDs from fully off to fully on.

16. The system of claim 15 wherein the plurality of LEDs include pure white LEDs.

* * * * *